(12) United States Patent
Molinazzi et al.

(10) Patent No.: US 11,841,251 B2
(45) Date of Patent: Dec. 12, 2023

(54) DIRECT IMPLEMENTATION OF SENSORS IN TUBES

(71) Applicant: EZMEMS LTD., Caesarea (IL)

(72) Inventors: Nicola Molinazzi, Kfar Sava (IL); Tsvi Shmilovich, Pardes Hanna-Karkur (IL)

(73) Assignee: EZMEMS LTD., Caesarea (IL)

( * ) Notice: Subject to any disclaimer, the term of this patent is extended or adjusted under 35 U.S.C. 154(b) by 64 days.

(21) Appl. No.: 16/977,992

(22) PCT Filed: Mar. 6, 2019

(86) PCT No.: PCT/IL2019/050246
§ 371 (c)(1),
(2) Date: Sep. 3, 2020

(87) PCT Pub. No.: WO2019/171376
PCT Pub. Date: Sep. 12, 2019

(65) Prior Publication Data
US 2021/0072052 A1 Mar. 11, 2021

Related U.S. Application Data

(60) Provisional application No. 62/638,970, filed on Mar. 6, 2018.

(51) Int. Cl.
*G01F 1/40* (2006.01)
*G01H 17/00* (2006.01)
(Continued)

(52) U.S. Cl.
CPC .............. *G01F 1/40* (2013.01); *G01H 17/00* (2013.01); *G01N 27/07* (2013.01); *G01N 27/08* (2013.01)

(58) Field of Classification Search
CPC .......... G01F 1/40; G01F 1/3282; G01F 1/662; G01F 15/063; G01F 1/363; G01F 15/00;
(Continued)

(56) References Cited

U.S. PATENT DOCUMENTS 4,616,505 A  10/1986 Jouwsma
4,822,250 A *  4/1989 Tsubouchi .............. F04B 43/04
                                                          417/322
(Continued)

FOREIGN PATENT DOCUMENTS

CN       104470554 A  *  3/2015  .............. A61M 1/16
DE    202015106040 U1 * 12/2016  ............... G01F 1/66
(Continued)

OTHER PUBLICATIONS

U.S. Appl. No. 62/782,538, filed Dec. 20, 2018.

*Primary Examiner* — Alexander Satanovsky
*Assistant Examiner* — Asm Fakhruddin
(74) *Attorney, Agent, or Firm* — Browdy and Neimark, P LLC

(57) ABSTRACT

A tube device is disclosed comprising a tube having at least one deformable component and one or more sensor elements. At least one of the one or more sensor elements is pattered or attached on the at least one deformable component of the tube and being configured to measure at least one property or condition of a substance contained or streamed inside the tube. The at least one deformable component can be at least one integral part of a wall section of the tube, or at least one deformable element attached to the tube, or at least one deformable element attached to respective at least one support element attached to the tube.

20 Claims, 20 Drawing Sheets

(51) Int. Cl.
*G01N 27/07* (2006.01)
*G01N 27/08* (2006.01)

(58) Field of Classification Search
CPC ........ G01H 17/00; G01N 27/07; G01N 27/08; G01M 5/0058; G01L 9/0027; G01L 19/0092
See application file for complete search history.

(56) References Cited

U.S. PATENT DOCUMENTS

| | | | |
|---|---|---|---|
| 5,770,805 A | 6/1998 | Castel | |
| 6,250,164 B1 | 6/2001 | O'Brien et al. | |
| 8,881,604 B2 * | 11/2014 | Zhu | G01F 1/8477 |
| | | | 73/861.354 |
| 2003/0010126 A1 | 1/2003 | Romanet et al. | |
| 2004/0222325 A1 * | 11/2004 | Regev | A01G 25/16 |
| | | | 239/569 |
| 2007/0163353 A1 | 7/2007 | Lec et al. | |
| 2012/0055265 A1 | 3/2012 | Melamed | |
| 2016/0061679 A1 | 3/2016 | Adams et al. | |
| 2016/0339431 A1 * | 11/2016 | Shmilovich | B01L 3/502715 |

FOREIGN PATENT DOCUMENTS

| | | | | |
|---|---|---|---|---|
| JP | H4-291118 A | | 10/1992 | |
| JP | 2001-174348 A | | 6/2001 | |
| JP | 2010120245 A | * | 6/2010 | ............ H05K 3/325 |
| JP | 2018-105622 A | | 7/2018 | |
| WO | 97/46852 | | 12/1997 | |
| WO | 2013/000453 A1 | | 1/2013 | |
| WO | 2015/114635 A1 | | 8/2015 | |
| WO | 2018/092130 A1 | | 5/2018 | |
| WO | 2018/235087 A1 | | 12/2018 | |

* cited by examiner

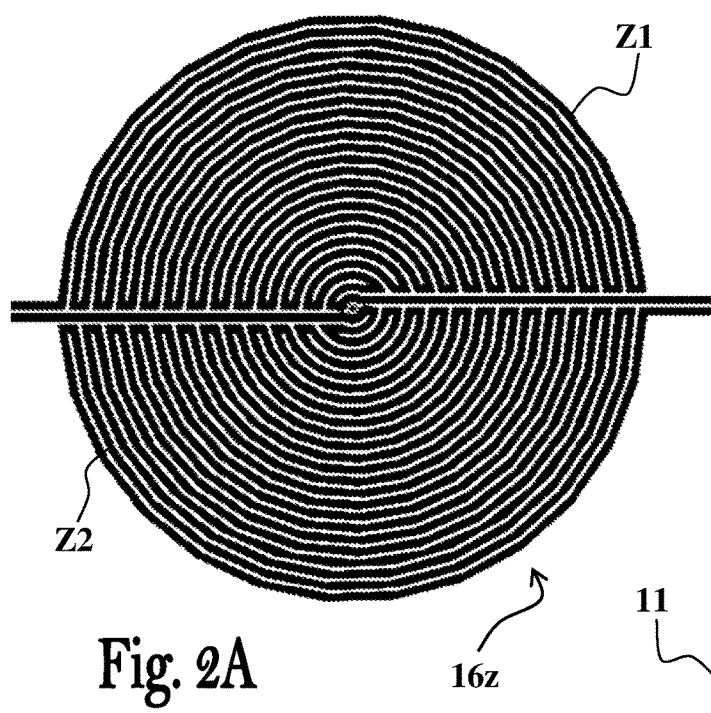
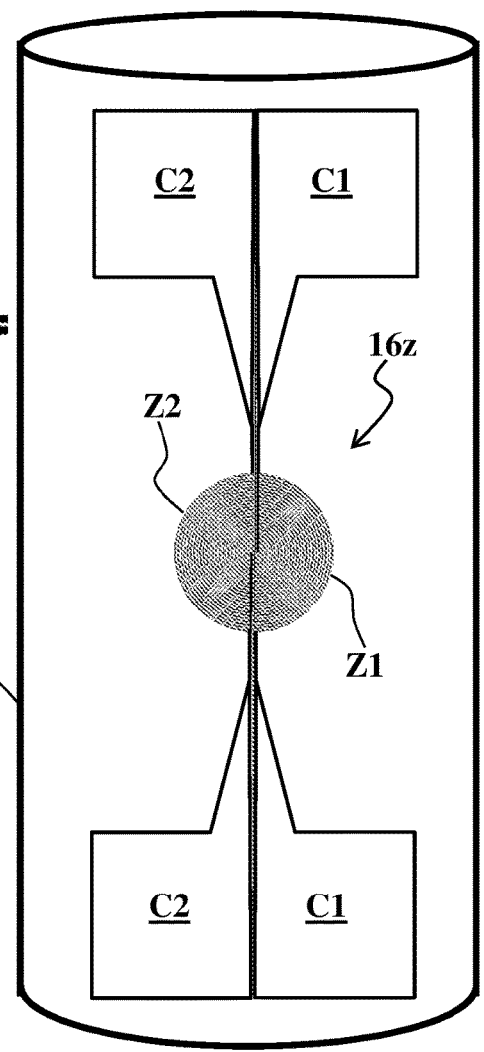
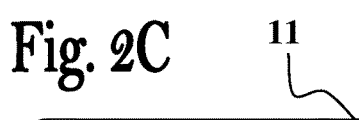
Fig. 2A
Fig. 2B
Fig. 2C
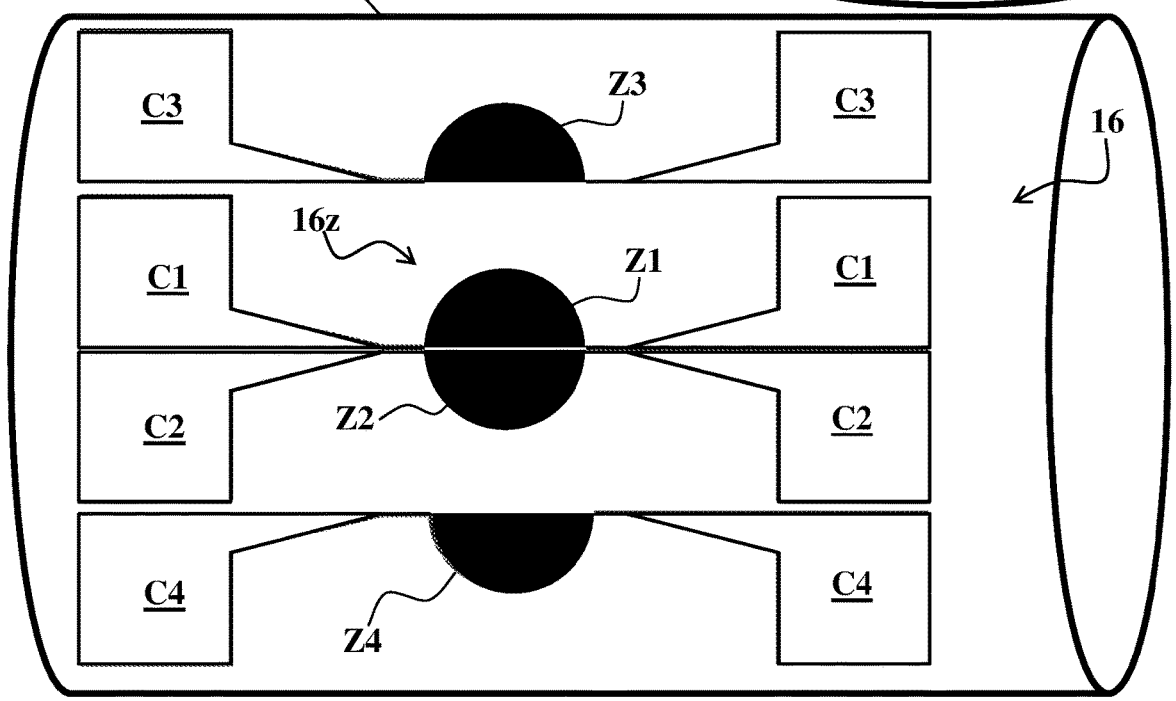

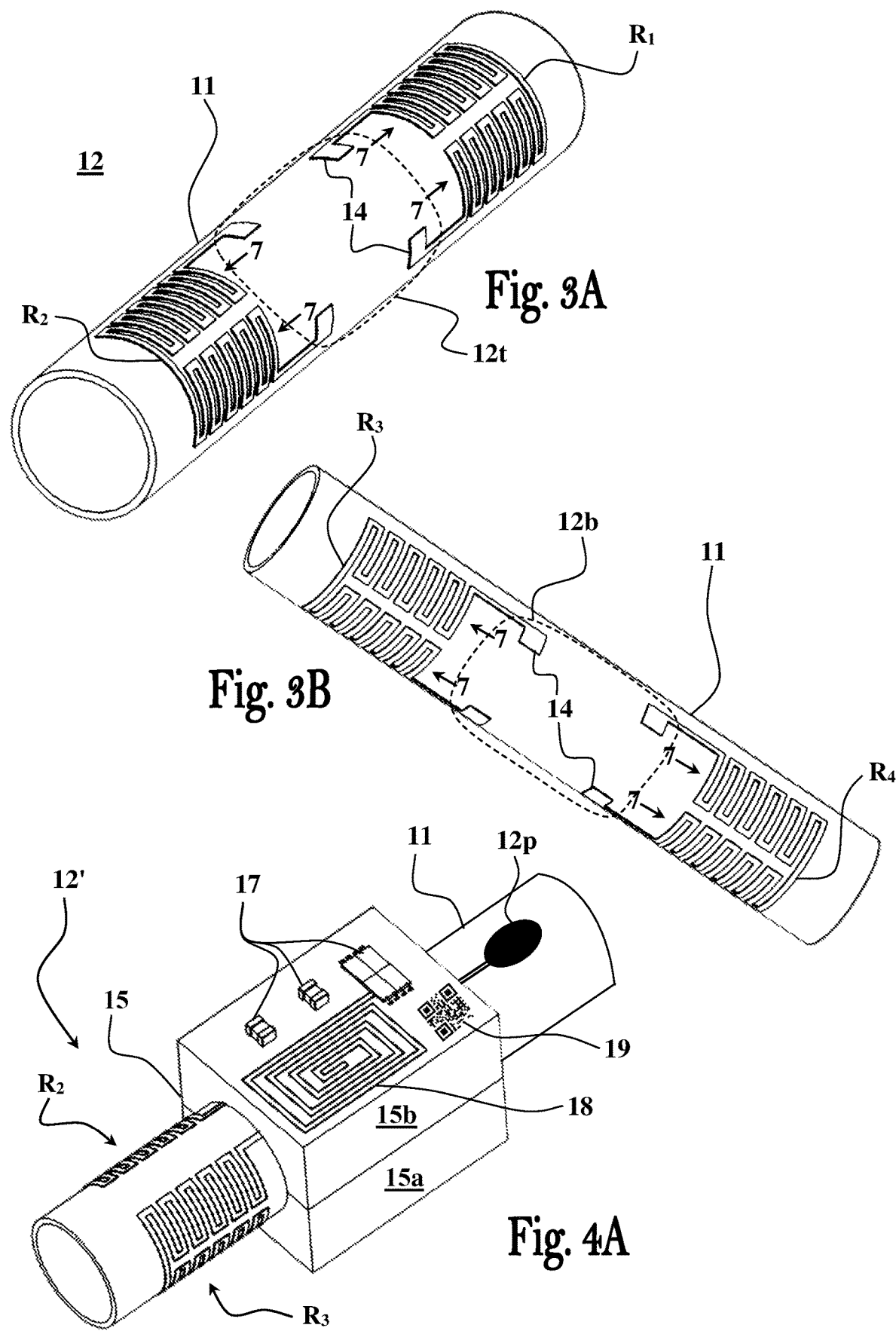

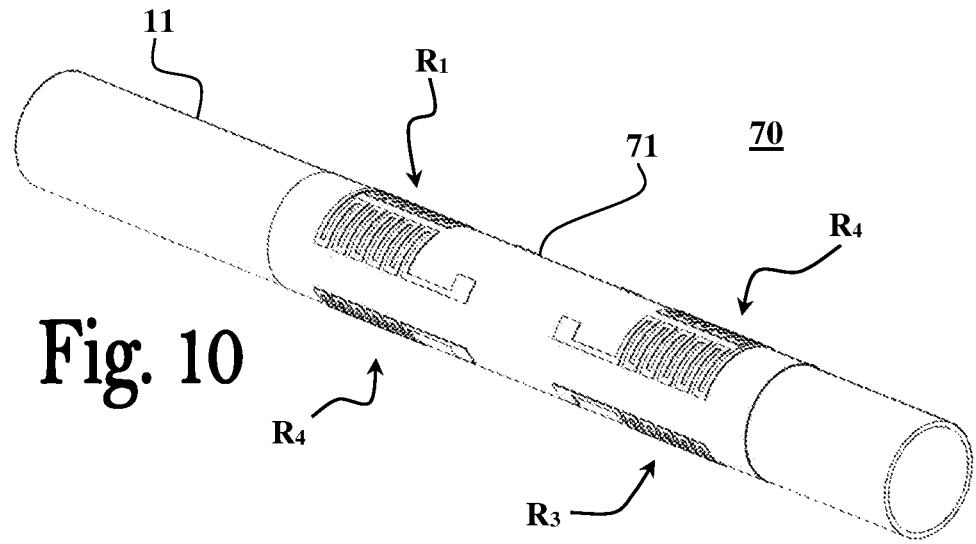
Fig. 10
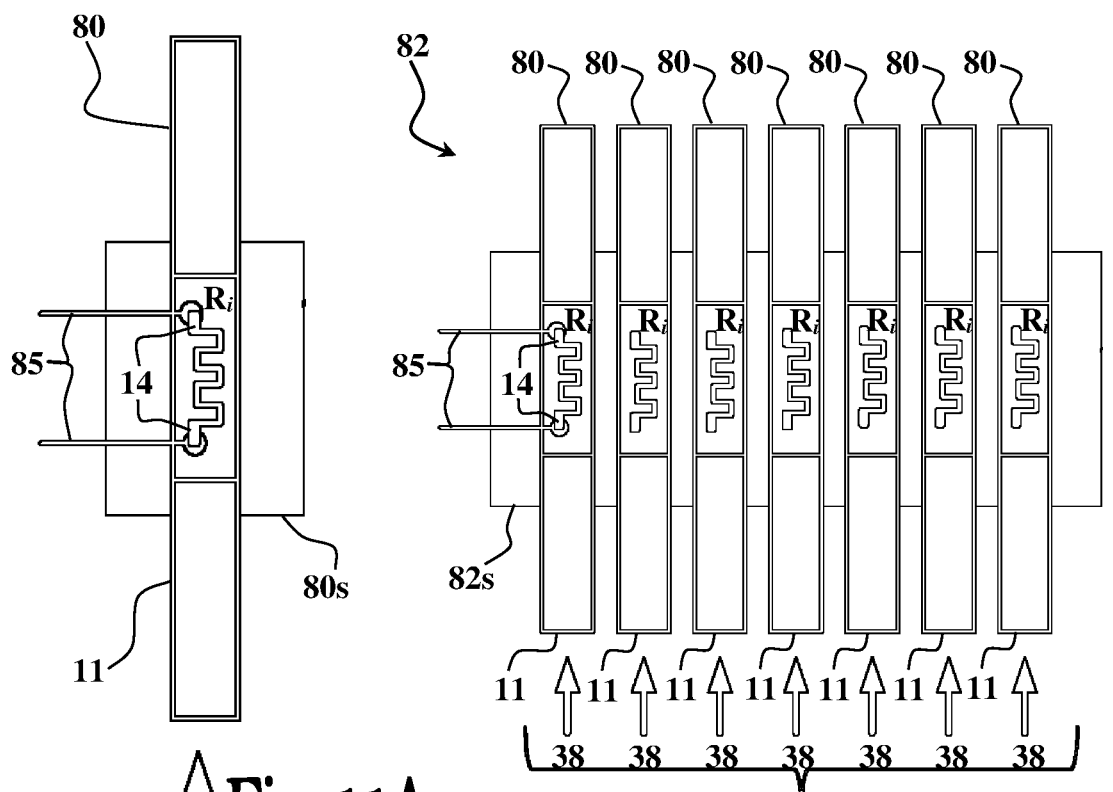
Fig. 11A
Fig. 11B

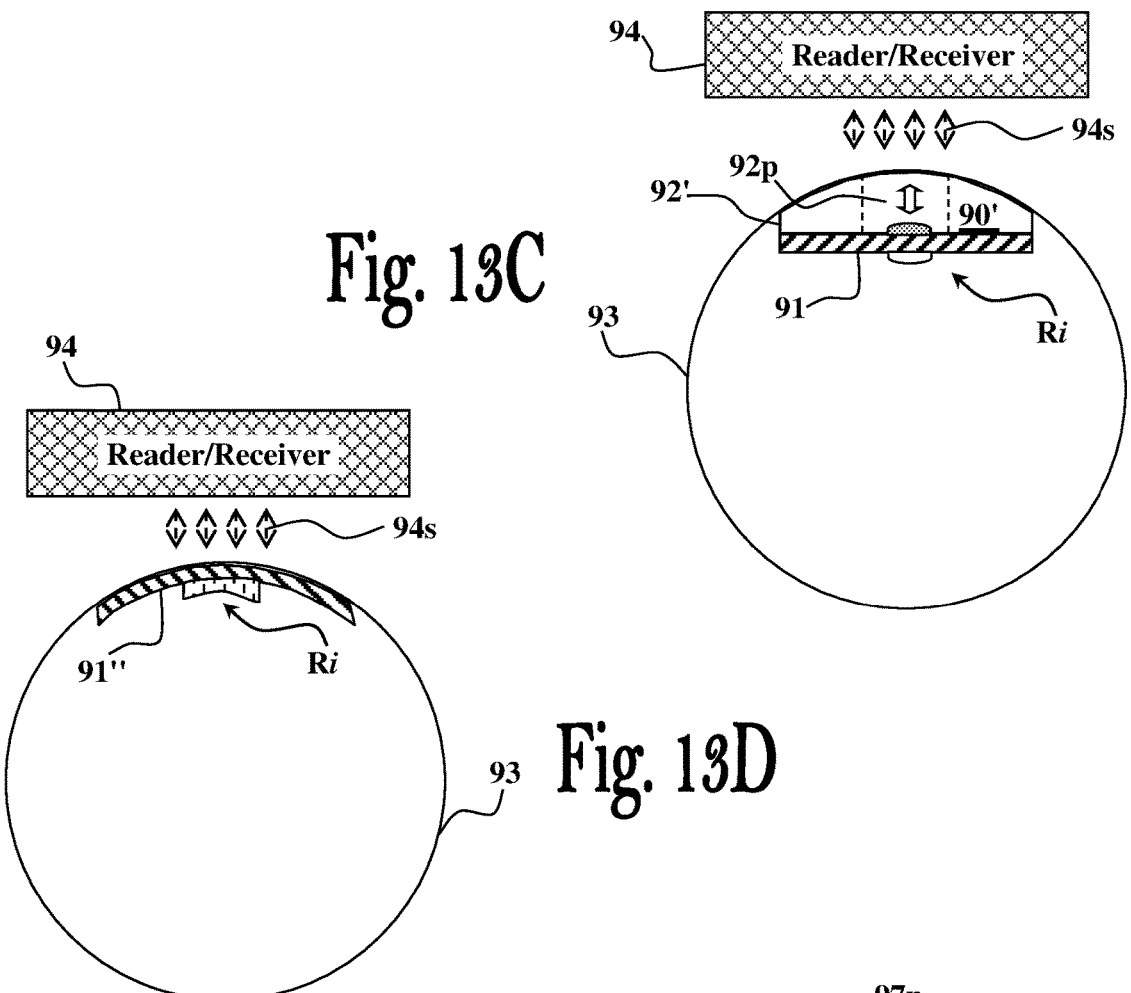
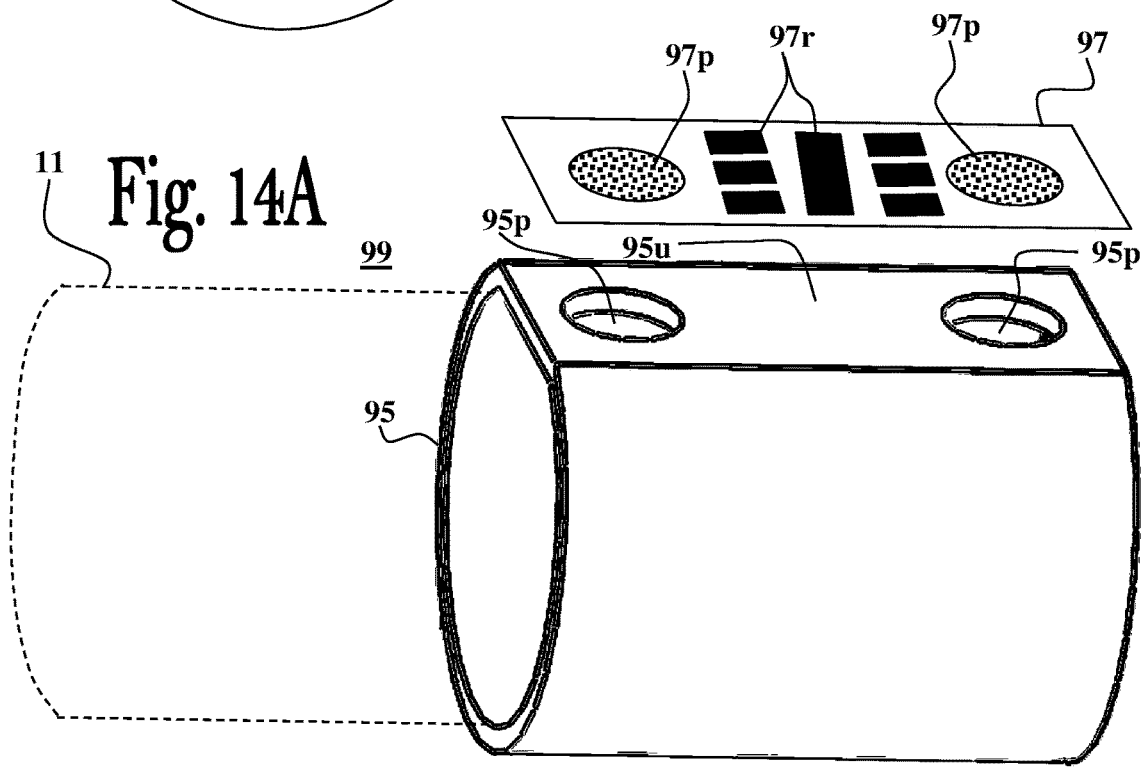

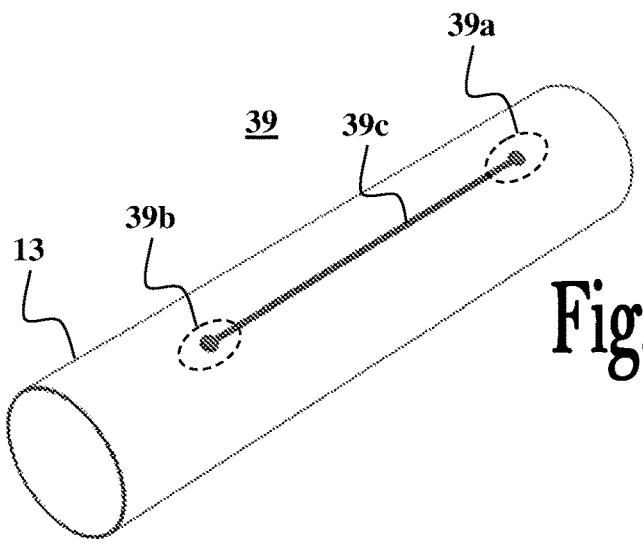
Fig. 15A
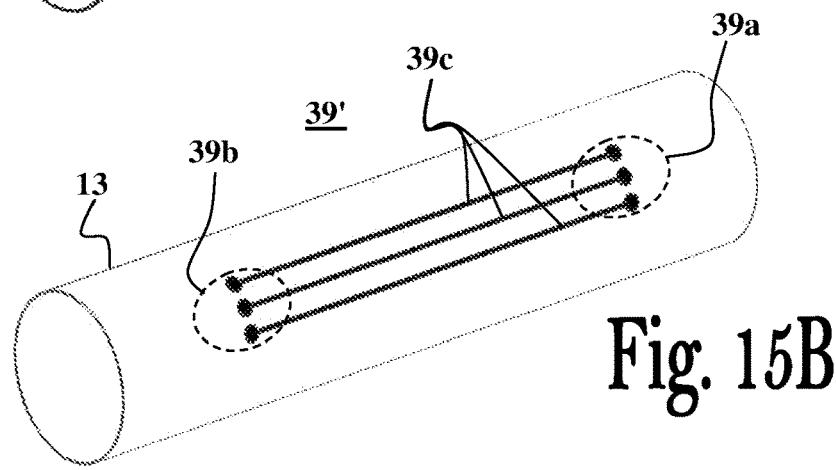
Fig. 15B
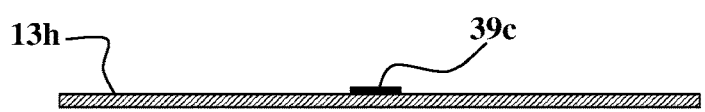
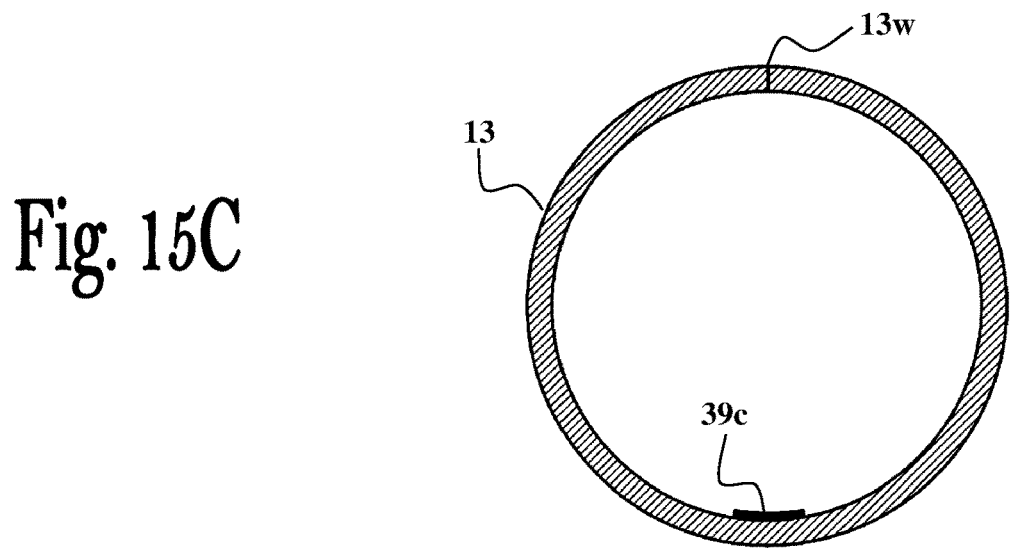
Fig. 15C

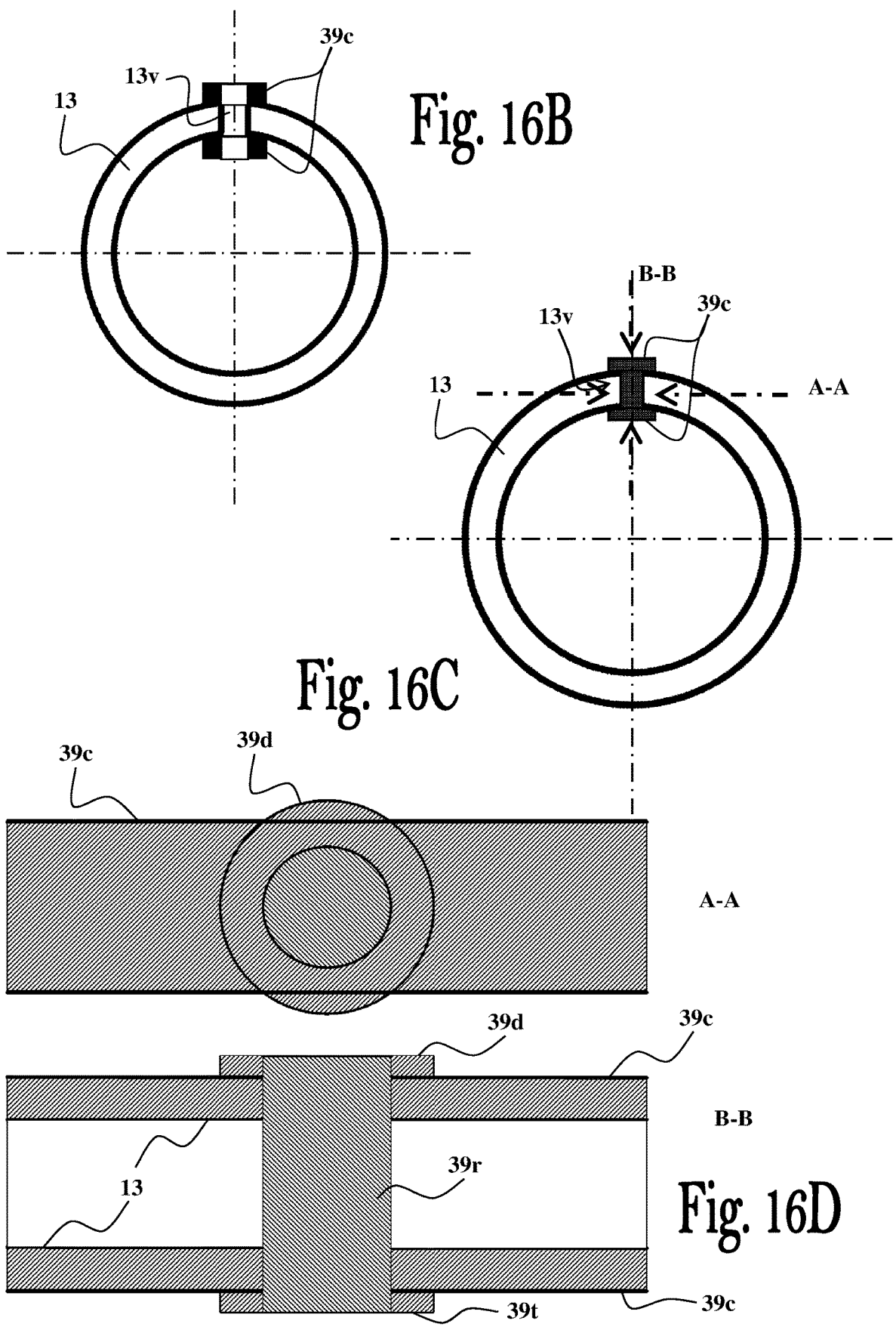

DIRECT IMPLEMENTATION OF SENSORS IN TUBES

TECHNOLOGICAL FIELD

The present invention is generally in the field of sensing devices, particularly strain gauge based sensing devices.

BACKGROUND

A strain gauge is a sensor element which electrical resistance is changed in response to strain changes of surface area on which the sensor element is attached. Various types of strain gauge sensing elements can be used to effectively measure pressure changes by measuring electrical resistance changes. These sensing elements mainly consist of an electrically insulating flexible foil used as a support, and a metallic electrically resistive pattern formed on the flexible foil.

In operation, strain gauges are attached onto surfaces of deformable objects by a suitable adhesive such that the foil, with the resistive pattern formed thereon, are deformed responsive to deformations of the object, thereby causing changes in the electrical resistance of the resistive pattern. The measured electrical resistance of the resistive pattern is related to the strain of the surface area to which the strain gauge is attached by a known gauge factor.

The most common technique to read the electrical resistance changes of strain gauges is by using the Wheatstone bridge configuration, wherein an excitation voltage is applied to the input leads of the bridge circuit, and a voltage reading is measured from the output leads of the bridge circuit. The gauge factor and voltage reading are then used to determine physical conditions and/or states experienced by the object to which the sensing element is attached, such as, but not limited to, pressure, flow rate, stretching forces, and suchlike.

U.S. Pat. No. 4,616,505 describes a fluid flow measuring device comprising elements positioned on the outer wall of a thermally conductive measuring channel and thermally insulated from the environment by an insulating body. The sensor elements can be heated for creating temperature gradient as a function of the fluid flow rate, which temperature gradient can be converted into and electrical measuring signal using a bridge circuit. The bridge circuit comprises four sensor elements which two by two are connected in series and are positioned onto the fluid measuring channel such that of each series circuit one element is positioned on a first section of the fluid measuring channel upstream in relation to a second section of the fluid measuring channel on which the other element of the respective series circuit is positioned, whereby the downstream end of each series circuit is connected to the upstream end of the respective other series circuit, and the electrical measuring signal is available at the junctions within said series circuits. The sensor elements are formed by thin or thick film resistors or integrated semiconductors on the electrically insulating fluid measuring channel respectively on a thin insulating layer on the electrically conducting fluid measuring channel.

US Patent Publication No. 2003/010126 describes a non-intrusive method of characterizing flow disturbances of a fluid inside a cylindrical pipe. In order to determine flow disturbances, the method consists in using variation in the pressure of the fluid as a first indicator: by placing at least one clamping collar around the pipe, the collar being provided with at least one deformation sensor sensitive to the deformation to which the pipe is subject due to variations of fluid pressure; by measuring the deformation variations detected by the deformation sensor; and by determining the variations of fluid pressure inside the pipe from measurements of deformation variations detected by said sensor.

GENERAL DESCRIPTION

A tube device having one or more electrical elements formed on a tube is disclosed. The one or more electrical elements comprises in some embodiments at least one sensor element configured to sense at least one property or condition of a substance contained inside, or streamed through, the tube. Optionally, and in some embodiments preferably, at least one contact pad and/or antenna element is also provided for signal communication with the at least one sensor element, and/or power supply thereto and/or any other of the electrical elements of the tube. One or more electrically conducting lines electrically coupled to the one or more electrical elements of the tube, can be also formed on the tube for the signal communication and/or power supply. For example, the antenna element and the one or more conducting lines can be used for energy harvesting e.g., of radio frequency (RF) radiation, that can be used for powering the at least one sensor element and/or the any other of the electrical elements of the tube.

Accordingly, in some embodiments the tube device is a sensor tube having one or more sensor elements formed or attached to internal and/or external surface areas of the tube. For example, but without being limiting, one or more sensor elements can be patterned or attached onto external surface(s) of the tube for sensing at least one property or condition of a substance contained, or streamed through the tube. Alternatively, or additionally, one or more sensor elements can be patterned or attached to a deformable sheet attached to the tube for sensing at least one property or condition of a substance contained, or streamed through the tube. In some embodiments the deformable sheet, with at least one of the one or more sensor elements patterned thereon, is sealably attached over at least one opening formed in the wall of the tube, to thereby enable measurement of at least one property (physical properties) or condition of fluid substance(s) streamed/introduced into the tube.

In other possible embodiments the deformable sheet, with the one or more sensor elements patterned thereon, is attached to a support element attached to the tube and configured to establish fluid communication between at least a portion of the deformable sheet and the lumen of the tube, to thereby enable measurement of at least one property (physical properties) or condition of fluid substance(s) streamed/introduced into the tube. This is achieved in some embodiments by forming at least one pass-through bore in the support element and respective at least one opening in the wall of the tube, attaching the support element to the tube such that fluid communication is established between the at least one pass-through bore of the support element and the respective at least one opening of the tube, and sealably attaching the deformable element over openings of the at least one pass-through bore of the support element such that at least one sensor element of the deformable sheet is located over at least one opening of the at least one pass-through bore of the support element.

For example, but without being limiting, the one or more sensor elements can used for measurement of fluid pressure and/or flow rate. Alternatively, or additionally, at least one of the sensor elements can be used to sense the temperature and/or electrical conductivity of the fluid within the tube. Methods of production and testing/calibrating the sensor tubes are also disclosed.

One inventive aspect disclosed herein relates to a tube device comprising a tube having at least one deformable component and one or more sensor elements, such as, but not limited to strain gauge sensors. At least one of the one or more sensor elements can be pattered or attached on the at least one elastically deformable component of the tube to measure at least one property or condition of a substance contained or streamed inside the tube (e.g., pressure, temperature, electrical conductivity, and/or flow rate). The at least one deformable component can be at least one integral part of a wall section of the tube, or at least one deformable element attached to the tube, or at least one deformable element attached to respective at least one support element attached to the tube. Optionally, but in some embodiments preferably, the at least one of the one or more sensor elements can be configured to change at least one measurable property thereof responsive to deformations of the at least one elastically deformable section of the tube.

Optionally, but in some embodiments preferably, the deformable element is an elastically deformable element. Alternatively, the deformable element is a substantially rigid element having at least one region/area adapted to elastically deform, or it can be a flexible or a plastically deformable element having at least one region/area adapted to elastically deform e.g., in response to fluid pressure. In some embodiments the sensor elements are formed or attached to at least one elastically deformable region or area of the deformable element.

The tube device comprises in some embodiments one or more electrically conducting lines formed on, or in, a wall section of the tube and electrically connected to at least one of the sensor elements for signal/data communication or for power supply. At least one via can be formed in the wall of the tube for electrically connecting to at least one of the electrically conducting lines formed on an outer wall section of the tube e.g., for connecting to at least one other of the electrically conducting lines formed on an inner wall section of the tube and/or to other components thereof. The device comprises in some embodiments at least one via formed in the wall of the tube for electrically connecting between at least one of the electrically conducting lines formed in the wall of the tube and at least one other of the electrically conducting lines formed on an inner, or on an outer, wall section of the tube.

In some embodiments the device comprises one or more electrodes formed on respective one or more inner wall sections of the tube for measuring one or more electrical properties of the substance. One or more respective vias can be formed in the wall of the tube for electrically connecting to the one or more electrodes. Optionally at least one of the vias comprises a rivet. The device can comprise one or more sensors formed or attached on respective one or more inner wall sections of the tube, and one or more respective vias formed in the wall of the tube and electrically connected to the one or more sensors. The one or more sensors configured to interact with the substance inside the tube, measure at least one property or condition thereof, and generate data/signals indicative thereof.

The device comprises in some embodiments at least one antenna element formed on a wall of the tube and electrically coupled to at least one of the one or more sensor elements. Alternatively, or additionally, at least one of the sensor elements is configured to communicate vibratory signals propagating through the substance contained inside, or streamed through, the tube, and/or propagating through the wall of the tube. Optionally, at least one connector element is formed/mounted in at least one end of the tube for connecting the tube to an external device or tube configured to introduce the substance thereinto. In some embodiments at least one constriction is formed inside the tube adjacent to at least one of the sensor elements.

The device comprises in some embodiments at least one of the sensor elements formed on an inner wall section of the tube. In such embodiments at least one via can be formed in the wall of the tube for electrically contacting the at least one sensor element formed on the inner wall section of the tube.

Optionally, the device comprises at least one contact pad electrically connected to at least one of the one or more sensor elements.

In some embodiments the at least one deformable element is attached to an inner, or to an outer, wall section of the tube and comprises at least one of the one or more sensor elements. At least one opening can be formed in the wall of the tube and sealably covered by a portion of the at least one deformable element comprising the at least one sensor element. One or more electrodes can be formed on respective one or more sections of the at least one deformable element located within the at least one opening. The one or more electrodes can be configured to contact the substance inside the tube and measure one or more electrical properties thereof. One or more respective vias can be formed in the at least one deformable element and electrically connected to the one or more electrodes. Optionally, but in some embodiments preferably, at least one electrical element and/or circuitry and/or antenna is formed on, or attached to, the at least one deformable element for signal communication and/or power supply for the at least one sensor element. One or more sensors can be formed or attached on sections of the at least one deformable element located within the at least one opening. The one or more sensors configured to interact with the substance inside the tube, measure at least one property or condition thereof, and generate data/signals indicative thereof.

In possible applications at least one support element is attached to the tube and configured to establish electrical connection with at least one of the one or more sensor elements for signal communication and/or power supply. Optionally, but in some embodiments preferably, at least one electrical contact element and/or circuitry and/or antenna element is formed on, or attached to, the at least one support element for signal communication and/or power supply for the at least one sensor element. The at least one support element can be configured to form at least one constriction inside the tube. Optionally, the at least one support element is configured to substantially prevent deformations from occurring in at least one portion of the tube.

Optionally, the at least one support element is attached to an inner wall section of the tube.

In some embodiment at least one opening is formed in the wall of the tube, respective at least one pass-through bore formed in the at least one support element in fluid communication with the at least one opening, and at least one deformable element is attached to the at least one support element to sealably cover by respective one region thereof comprising at least one of the one or more sensor elements the at least one pass-through bore.

A measurement circuitry can be attached to the tube, and/or to the deformable element, and/or to the at least one support element attached to the tube, and electrically coupled to at least one of the one or more sensor elements. The measurement circuitry can be coupled to the at least one antenna element and configured to communicate signals to and from the at least one antenna element. Optionally, but in some embodiments preferably, at least one of a memory and an optically readable medium or markings having calibration data associated with the device stored or encoded therein are provided.

Another inventive aspect of the subject matter disclosed herein relates to a sensor device comprising a tube having at least one elastically deformable section or area implemented by a wall section of the tube, and/or implemented by a deformable sheet sealably attached over at least one opening formed in the wall of the tube, and one or more sensor elements at least some of which are pattered on the at least one elastically deformable section/sheet or area of the tube.

At least one of the sensor elements is configured to change at least one measurable property (e.g., an electrical property such as electrical resistance) thereof responsive to deformations of the at least one elastically deformable section of the tubes. Optionally, and in some embodiments preferably, the sensor device is configured and arranged to measure at least one of temperature, pressure, and flow rate, of a fluid substance introduced into the tube.

In some possible embodiments at least one of the sensor elements is a strain gauge sensor element having a wavy/curly and/or interfolding shape patterned along a length of the tube. The sensor device comprises in some embodiments one or more circuitries (e.g., measurement, communication, harvesting, and/or processing) attached to, or formed on, the tube and electrically coupled to the one or more sensor elements pattered thereon. The one or more circuitries can include at least one antenna element, and it can be configured to communicate signals (e.g., radiofrequency/RF signals) to and from the at least one antenna element, and/or for energy harvesting for powering the at least one sensor element and/or one or more circuitries.

Yet another disclosed inventive aspect relates to a measurement device comprising a hollow object having at least one lumen usable for containing or streaming a substance, at least one sensor formed or patterned on an internal wall of the hollow object to reside within the at least one lumen, and at least one via formed in the wall of the hollow object and electrically connected to the at least one sensor, the at least one sensor configured to interact with the substance when introduced into the at least one lumen and measure at least one property or condition thereof. The measurement device can comprise at least one sensor formed on an external portion of the wall of the hollow object and configured to measure at least one property or condition thereof when introduced into the at least one lumen.

The measurement device comprises in some embodiments at least one deformable component being at least one integral part of a wall section of the hollow object, or at least one deformable element attached to said hollow object, or at least one deformable element attached to respective at least one support element attached to said hollow object. The at least one deformable component can have at least one sensor formed or attached thereon. The measurement can comprise at least one electrical element, and/or circuitry, and/or antenna element, and electrically coupled to at least one of the one or more sensors.

In some embodiments the measurement device comprises one or more electrodes formed to reside within the at least one lumen. The one or more electrodes can be configured to interact with the substance inside the at least one lumen and measure one or more electrical properties thereof.

Another disclosed inventive aspect relates to a method of fabricating a tube device. The method comprising providing a tube having at least one deformable area or section component and patterning or attaching on the at least one deformable area or section component of the tube one or more sensor elements. The at least one deformable component can be at least one integral part of a wall section of the tube, or at least one deformable element attached to the tube, or at least one deformable element attached to respective at least one support element attached to the tube.

The method can comprise forming one or more electrically conducting lines on, or in, a wall section of the tube. The one or more electrically conducting lines can be electrical connected to at least one of the sensor elements. The forming of the one or more electrically conducting lines can comprise introducing an electrically conducting wire in, or on, a wall of the tube, in an extrusion or pultrusion process used to manufacture said tube. Alternatively, the forming of the one or more electrically conducting lines comprises pattering the one or more electrically conducting lines on an outer wall of the tube after it is ejected in an extrusion or pultrusion process used to manufacture said tube.

Optionally, but in some embodiments preferably, the method comprises forming at least one via in the wall of the tube for electrically connecting between the electrically conducting lines of the tube. The method comprises in some embodiments forming at least one electrical element, and/or circuitry, and/or antenna element on a wall of the tube, or attaching it thereto, and electrically coupling it to at least one of the one or more sensor elements.

In some embodiments the method comprises forming at least one constriction inside the tube adjacent to at least one of the sensor elements.

The method can comprise patterning or attaching at least one of the one or more sensor elements on an inner wall section of the tube. The method can comprise forming at least one via in the wall of the tube for electrically contacting the at least one sensor element formed on the inner wall section of the tube.

Optionally, but in some embodiments preferably, the method comprises forming at least one electrode on respective at least one inner wall section of the tube, forming respective at least one via in the wall of the tube, and electrically connecting between the at least one via and the at least one electrode. The method can comprise forming or attaching at least one sensor on respective at least one section of the deformable element located within the at least one opening of the tube for the at least one sensor to contact the substance introduce into the tube. The can comprise forming respective at least one via in the deformable element, and electrically connecting between the at least one via and the at least one electrode or sensor.

In a variant, the method comprises forming at least one of the one or more sensor elements on the at least one deformable element, and attaching the at least one deformable element to an inner, or to an outer, wall section of the tube. The method can comprise forming at least one opening in the wall of the tube and sealably covering it by a portion of the at least one deformable element comprising the at least one sensor element.

Optionally, but in some embodiments preferably, the method comprises forming at least one electrode on respective at least one section of the deformable element located within the at least one opening of the tube for the at least one electrode to contact the substance introduce into the tube, forming respective at least one via in the deformable element, and electrically connecting between the at least one via and the at least one electrode.

The method comprises in some embodiments attaching at least one support element to the tube and establishing electrical connection between the at least one support element and at least one of the one or more sensor elements. The method can comprise forming at least one electrical contact element, and/or circuitry, and/or antenna element on the at least one support element, or attaching it thereto. Optionally, the attaching of the at least one support element comprises deforming at least a portion of the tube to form at least one constriction thereinside. In a possible variant, the method comprises attaching the at least one support element to an inner wall section of the tube.

In some embodiments the method comprises forming at least one opening in the wall of the tube and respective at least one pass-through bore in the at least one support element before attaching it to the tube, and attaching the at least one deformable element to the at least one support element to sealably cover by respective one region thereof comprising at least one of the one or more sensor elements the at least one pass-through bore. The attaching of the at least one support element comprises establishing fluid communication between the opening in the wall of the tube and the at least one opening.

The method can comprise attaching measurement circuitry to the tube, and/or to the at least one support element, and/or to the at least one deformable element, attached to the tube, in electrical contact with at least one of the one or more sensor elements. The method can comprise electrically coupling the measurement circuitry to the at least one antenna element.

Another disclosed inventive aspect relates to a method of fabricating a sensor tube, the method comprising providing a tube, forming at least one opening in a wall of the tube, patterning or attaching on a deformable sheet one or more sensor elements, and sealably attaching the deformable sheet over the at least one opening such that at least one of the sensor elements is located thereover. Optionally, the method comprises forming a constriction in the tube. The method can comprise forming at least one electrode on respective at least one section of the deformable element located within the at least one opening of the tube for the at least one electrode to contact the substance introduced into the tube, forming respective at least one via in the deformable element, and electrically connecting between the at least one via and the at least one electrode.

The methods can comprising attaching at least one electrical circuitry to the tube, and/or to the deformable sheet before or after attaching it to the tube.

In embodiments comprising a constriction inside the tube at least one of the sensor elements can be located at one side of the constriction and at least another one of the sensor elements can be located at another side of the constriction.

Another inventive aspect of the subject matter disclosed herein relates to a method of fabricating a sensor tube. The method comprising providing a tube having at least one elastically deformable area or section, and patterning or attaching on the at least one elastically deformable area or section of the tube one or more sensor elements.

Alternatively, or additionally, the method comprises forming at least one opening in a wall of the tube, patterning or attaching on a deformable sheet one or more sensor elements, and sealably attaching said deformable sheet over said at least one opening such that at least one of the sensor elements patterned on the deformable sheet is located over the at least one opening. The at least one sensor element located over the at least one opening by attachment of the deformable sheet can be in addition to, or instead of, sensor elements directly patterned on the wall of the tube.

Optionally, and in some embodiment preferably, the method comprises forming a constriction in the tube. The patterning can comprise locating at least one of the sensor elements at one side of the constriction and locating at least another one of the sensor elements at another side of the constriction.

The method may comprise attaching electrical circuitry to the tube and/or to the deformable sheet before or after attaching the deformable sheet to the tube, for measuring, processing and/or communicating at least one electrical property of the one or more sensor elements patterned on the tube, and/or for powering components of the sensor tube.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A to 1C schematically illustrate sensor configurations according to some possible embodiments having wavy patterns suitable for use on tubes, wherein FIG. 1A shows a sectional view of a sensor tube and FIGS. 1B and 1C show possible implementations of gauge sensors formed along a length portion of a sensor tube;

FIGS. 2A to 2C schematically illustrate sensor configurations according to some possible embodiments having interfolding patterns suitable for use on tubes, wherein FIG. 2A shows two half circle sensor elements patterned one adjacent the other to form a circular-shaped sensor arrangement filled by the interfolding patterns, FIG. 2B shows a possible implementation of the circular sensor arrangement on a tube, and FIG. 2C shows a possible sensor arrangement suitable for bridge circuitries implementations on tubes;

FIG. 3A and FIG. 3B respectively show top and bottom views of a sensor arrangement suitable for use on a tube comprising according to some possible embodiments a plurality of strain gauge elements formed therealong;

FIGS. 4A to 4D schematically illustrate a sensor arrangement suitable for use on tubes and comprising according to some possible embodiments one or more electrical/electronic circuitries mechanically and electrically coupled thereto for measuring electrical signals, wherein FIG. 4A shows a sensor arrangement with two strain gauge elements implemented on a tube with one or more circuitries for measuring electrical signals therefrom, FIGS. 4B and 4C show exploded and top perspective views of a sensor arrangement comprising four strain gauge elements implemented on a tube with circuitries for measuring electric signals therefrom, and FIG. 4D shows a perspective view of a sensor arrangement implemented on a tube and configured to electrically connect to external machinery/device;

FIGS. 5A to 5F schematically illustrate sensor arrangements configured according to some possible embodiments for attachment on tubes, wherein FIG. 5A is an exploded view showing the sensor arrangement before attachment to the tube, FIG. 5B is a perspective view showing the sensor arrangement after attachment to the tube, FIGS. 5C and 5D are exploded perspective views of a coupling arrangement configured for electrically interfacing to the sensor arrangement, FIG. 5E shows a perspective view of the electrical interface of the coupling arrangement, and FIG. 5F shows a perspective view of the sensor arrangement assembled on the tube;

FIGS. 8A and 8B schematically illustrate attachment of a sensor tube according to some possible embodiments, wherein FIG. 8A shows connection of a sensor tube to one or more fluid conduits, and FIG. 8B demonstrates using a tube of a different diameter to construct a constriction;

FIGS. 9A to 9C schematically illustrate production of sensor tubes according to some possible embodiments, wherein FIG. 9A illustrates deposition of sensor elements (e.g., strain gauge) patterns onto a tube, FIG. 9B illustrates printing technique for forming sensor element (e.g., strain gauge) patterns onto a tube, and FIG. 9C illustrates a process for deforming the shape of a sensor tube to provide a desired cross-sectional shape;

FIG. 10 schematically illustrates a sensor tube according to some possible embodiments using a deformable sheet/sleeve, having strain gauge elements formed thereon, attached to the tube;

FIGS. 11A and 11B schematically illustrate testing and/or calibrating sensor tube(s) according to some possible embodiments;

FIGS. 13A to 13D schematically illustrate various configurations and techniques for coupling sensor element(s) to a wall section of a tube according to some possible embodiments, wherein FIG. 13A is a perspective view of a support element configured to couple a deformable element and sensor element(s) thereof to an external wall section of a tube, FIG. 13B shows a sectional view of the assembly over the external wall section of the tube, and FIGS. 13C and 13D show sectional views of assembly of a deformable element comprising circuitries and sensor element(s) attached to an internal wall section of a tube and configured to interact with an external reader capable of powering and/or communicating signals/data with the circuitries and/or sensor element(s);

FIGS. 14A to 14D show an coupling element configured to couple a deformable element comprising circuitries and sensor element(s) to a tube and forming a flow restrictor for measuring flow rate therethrough, wherein FIG. 14A shows a perspective view of the coupling element, FIG. 14B shows a sectional view of the coupling element, and FIGS. 14C and 4D show a cross-sectional view of possible coupling assemblies;

FIGS. 15A to 15E schematically illustrate use of conducting lines formed on, or in, a wall of a tube for electrically connecting between elements mounted/formed on the tube e.g., for powering and/or communicating data/signals between sensors/circuitries, and techniques of applying the conducting lines on the tubes, according to some possible embodiments, wherein FIGS. 15A and 15B shows connectivity between two elements using one or more conducting lines, FIG. 15C exemplifies a possible technique for applying conducting lines on an inner wall of a tube, FIG. 15D exemplifies a possible technique for applying conducting lines in or on an inner wall of a tube manufactured by extrusion/pultrusion, and FIG. 15E exemplifies a possible technique for applying conducting lines on an outer wall of a tube manufactured by extrusion/pultrusion;

FIG. 16A to 16D schematically illustrate application of conducting lines on inner, and/or outer, and/or inside, a wall of tube, and techniques of connecting therebetween according to some possible embodiments, wherein FIG. 16A shows a sectional view of a tube having at least one conducting line formed on its outer wall, at least one conducting line formed on its inner wall, and at least one conducting line formed inside its wall, FIGS. 16B and 16C show use of vias to electrically connect between the conducting lines, and FIG. 16D shows use of rivets to electrically connect between the conducting lines;

FIGS. 19A to 19C schematically illustrate tube sensor devices having immersible electrodes according to some possible embodiments, wherein FIG. 19A shows a tube device having electrodes formed on inner side of a wall of the tube, FIG. 19B shows a tube device having electrodes formed on a bottom side of a deformable element attached to the tube, and FIG. 19C shows a tube device having electrodes formed on a bottom side of a deformable element attached to a support element attached to the tube.

DETAILED DESCRIPTION OF EMBODIMENTS

Figure 1A:
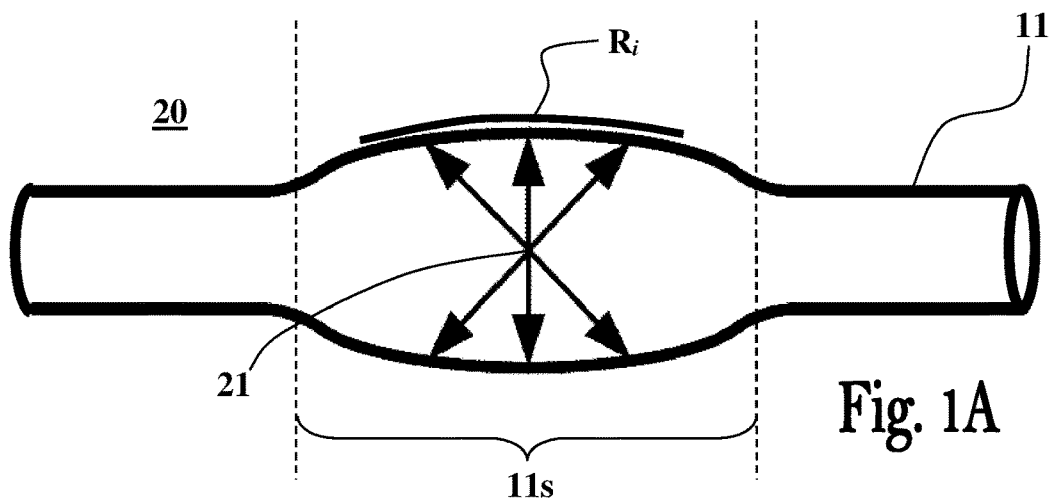

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. This invention may be provided in other specific forms and embodiments without departing from the essential characteristics described herein.

The present application describes sensor arrangements suitable for use on elastic/flexible or rigid tubes and/or other hollow structures having at least one lumen for holding and/or streaming a substance, as well as designs and methods for fabricating sensor tubes comprising strain gauge(s) formed on or in tubes, for measuring physical properties/states, such as, but not limited to, pressure, and/or flow rate, and/or temperature, of fluidic substance(s) introduced into, or streamed through, the tubes. Optionally, and in some embodiments preferably, the tubes used for the sensor tubes, or at least portions of these tubes, are made from a soft or elastically deformable material, such as, but not limited to, a type of polymeric/plastic, silicone, rubber, elastic-glass, material, or combinations thereof. In other disclosed embodiments the tubes can be made from substantially rigid materials, such as, but not limited to, metallic, rigid glass, ceramic, plastic, material, or any combination thereof.

A pressure sensor tube (PST) device for pressure and/or flow rate measurement can be configured and arranged according to some possible embodiments to include one or more pressure sensors, and optionally at least one temperature sensor. The PST can be fabricated as a single sensor arrangement unit connectable to an existing tube. Alternatively, the sensor arrangement can be implemented directly on, or in a wall of, a tube e.g., during fabrication process of the tube, or partly implemented directly on, or in a wall of, the tube and partly attached directly thereonto. The sensor arrangement comprises in some embodiments matching and/or locking and/or latching mechanisms, and/or electrical connectors for coupling its sensor element(s) with external system/machinery. The various embodiments described below can be used to implement PST/tube devices, with or without, a temperature sensor (shown only in FIG. 4A).

For an overview of several example features, process stages, and principles of the invention, the tube device/sensor units examples illustrated schematically and diagrammatically in the figures are intended for fluidic/gaseous tubes, or other hollow objects having at last one lumen usable for holding, or streaming, a substance. These tube device/sensor units are shown as one example implementation that demonstrates a number of features, processes, and principles used to provide a sensor unit/device implemented on, or in, a tube, but they are also useful for other applications and can be made in different variations and/or implemented on other objects/structures having at least one lumen and/or hollow part suitable for holding and/or streaming a substance. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in sensing applications may be suitably employed, and are intended to fall within the scope of this disclosure.

FIG. 1A schematically illustrates a tube device 20 configured and arranged to measure internal pressure 21 acting on inner surfaces of the tube 11 and thereby causing deflection and/or deformations of the wall sections of the tube 11. In this specific and non-limiting example the tube 11 is configured to include at least one elastically deformable section 11s on a surface area of which one or more sensor elements $R_i$ are attached or formed/patterned (where i>0 is a positive integer). The internal pressure 21 acting on the internal walls of the elastically deformable tube 11 causes expansion/inflation (or deflation in case of vacuum) of the elastically deformable section 11s of the tube 11, which deforms the sensor element(s) $R_i$ attached or patterned thereon. The deformation of the sensor element(s) $R_i$ causes measurable changes of electrical properties of the sensor element(s) used for determining the amount of internal pressure 21 inside the tube 11. Optionally, and in some embodiments preferably, the measurable electrical property of the sensor element(s) $R_i$ is its electrical resistance.

Figures 1B, 1C:
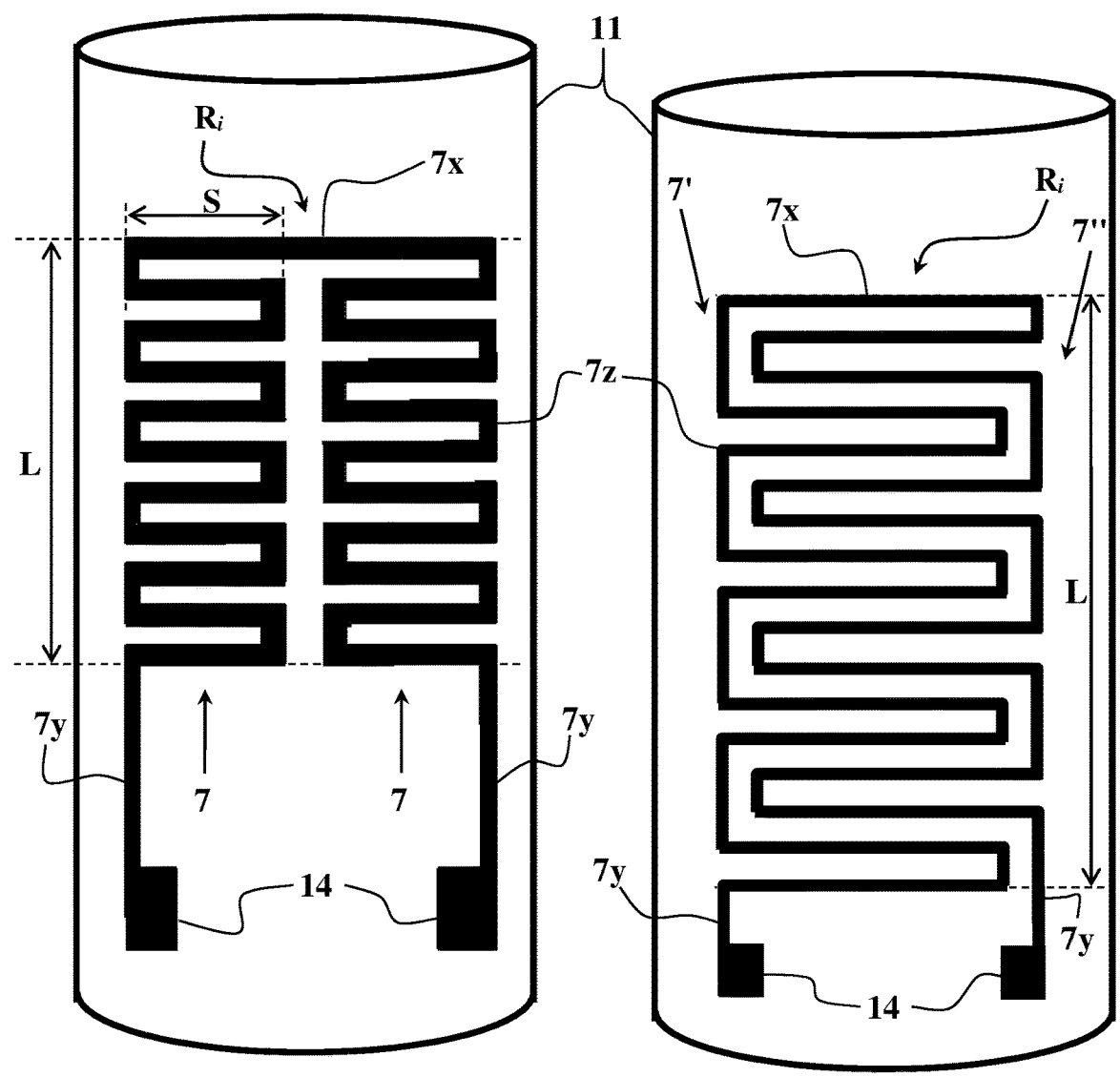

FIG. 1B shows an embodiment of a strain gauge sensor element $R_i$ structured according to some possible embodiments from conductive lines 7z configured in a form of one or more rectangular-shaped spaced apart wavy patterns 7. Optionally, and in some embodiments preferably, the conductive lines 7z are configured to form either resistive, piezo-resistive or piezo-electric transducing element $R_i$ arranged to measure the pressure inside the tube 11 responsive to the deflection/deformation of the a wall section of the tube 11.

The strain gauge element sensor $R_i$ shown in FIG. 1B comprises two spaced apart and serially connected wavy patterns 7 formed one parallel to the other along a certain length L of the tube 11. It is however noted that a different number (e.g., one, three, or more) of such wavy patterns 7 can be similarly used in other possible embodiments. In this specific and non-limiting example the wavy patterns 7 are rectangular-shaped wavy patterns, where each wave pattern 7 traverses an arcuate section S of the tube 11. Serial electrical connection between the wavy patterns 7 is achieved at first ends of the wavy patterns 7 by arc conductor 7x, and a measurement terminal 14 of each wavy pattern 7 is formed at the end of a respective lengthwise extending conductor 7y electrically connected at a second end of each wavy pattern 7. In this specific and non-limiting example the measurement terminals 14 have a rectangular shape extending one towards the other, but of course the measurement terminals 14 can be similarly configured with other shapes, such as, but not limited to, circular, rectangular, polygonal, and suchlike.

Another possible strain gauge element design is shown in FIG. 1C, wherein the strain gauge element $R_i$ is formed from two rectangular-shaped wavy patterns 7' formed along a certain length L of the tube 11 and having some predetermined duty cycle for intertwining at least one rectangular wavy pattern 7" at least partially within the rectangular wave patterns 7'. Serial electrical connection between the rectangular wavy patterns 7' is similarly obtained at a first end by conductor 7x, and with the measurement terminals 14 by lengthwise extending conductors 7y.

It is noted that though the strain gauge sensors shown in the FIGS. 1B and 1C are in a form of rectangular-shaped wavy patterns they may assume any other suitable configuration. For example, and without being limiting, the conductive lines of the strain gauge sensors may be configured to form Rosetta-like patterns, and/or comprise sinusoidal-shaped lines, and/or triangular-shaped lines, and/or sawtooth-shaped lines, or combination thereof.

FIG. 2A schematically illustrates a sensor arrangement 16z comprising two adjacently patterned sensor elements Z1 and Z2. Each of sensor elements Z1 and Z2 can be formed by electrically connected curved conductive lines configurations having a plurality of interfolding patterns suitable for application on a tube. In this specific and non-limiting example each sensor element is comprised from a plurality of serially connected arc-shaped patterns successively interfolded one into the other to form a generally half circle sensor shape (also known as a rosette pattern). The sensor elements Z1 and Z2 can be patterned in close adjacency one to the other to form together the generally circular sensor arrangement illustrated in FIG. 2A. It is noted that any other suitable successively interfolding patter can be used to form sensor elements having different rosette shape e.g., rectangular, triangular, polygonal, etc., such as described and illustrated in international patent publication Nos. WO 2015/114635, WO 2018/235087, and/or WO18092130, of the same applicant hereof, the disclosure of which is incorporated herein by reference.

Each of the sensor elements Z1 and Z2 comprises two electrically conducting lines extending horizontally i.e., each passing perpendicular to the extremities of at least some of the arc-shaped electrically conductive lines, in opposite directions for establishing electrical connection with its interfolded pattern. FIG. 2B shows a possible implementation of the sensor arrangement 16z on a tube 11. The sensor elements Z1 and Z2 can be formed on, or attached to, a substantially flexible or elastically deformable area or section of the tube 11. Alternatively, the entire length of the tube 11 is made from a substantially flexible or elastically deformable material.

Two pairs of contact pads (also referred to herein as measurement terminals), C1 and C2, can be also formed on, or attached, to the tube 11, in electrical connection to the conducting lines of the respective sensing element, to facilitate electrical connection/interface thereto. More particularly, the pair of contact pads C1 provided on the tube 11 aligned and longitudinally spaced apart are electrically connected to the conducting lines of the sensor element Z1, and the pair of contact pads C2 provided on the tube 11 aligned and longitudinally spaced apart are electrically connected to the conducting lines of the sensor element Z2. Optionally, and in some embodiments preferably, each sensor element and its respective contact pads are longitudinally formed on, or attached to, tube 11.

FIG. 2C shows a possible sensor arrangement 16 suitable for implementing a bridge circuitry on a tube 11 (e.g., as described in international patent application No. PCT/IL2018/050690 and/or international patent publication No. WO18092130, the content of which is incorporated herein by reference), which at least some portion thereof is made from substantially flexible or elastically deformable material. The sensor arrangement 16 comprises four sensing elements, Z1, Z2, Z3 and Z4, each of which is made from electrically conducting lines configured to form circular successively interfolding patterns forming a generally half circle shape, as illustrated in FIG. 2A. The sensor elements Z1 and Z2 are located one adjacent to the other to from the generally circular shape sensor structure 16z illustrated in FIGS. 2A and 2B, sandwiched between the sensor elements Z3 and Z4.

In this specific and non-limiting example the sensor elements Z3 and Z4 are arranged such that their circular patterns are directed to lateral sides of the tube 11. In some embodiments the sensor arrangement 16 is used to implement a Wheatstone bridge, and the sensor elements Z3 and Z4 are placed over wall portions of tube 11 that are significantly not subject to deformations, or where deformation of the wall of the tube is very limited, for using them to conduct reference measurements (e.g., to compensate temperature changes).

Each sensor element, Z1, Z2, Z3 and Z4, is electrically connected to a respective pair on contact pads, C1, C2, C3 and C4, configured to facilitate electrical connection/interface thereto. The contact pads can be aligned to form two substantially parallel columns of contact pads, with the sensor elements located therebetween. Optionally, and in some embodiments preferably, each sensor element and its respective contact pads are longitudinally formed on, or attached to, the tube 11, such that each column of contact pads is circularly distributed over an arc-section of the tube 11.

FIGS. 3A and 3B respectively show top and bottom views of a specific embodiment of a tube sensor 12 having four strain gauge sensors $R_i$ (i.e., $1 \leq i \leq 4$). In this embodiment two strain gauge sensors $R_i$ and $R_2$ are formed along predetermined lengths on the top side of the tube 11, and two strain gauge sensors $R_3$ and $R_4$ are formed along predetermined lengths of the opposite side (bottom side) of the tube 11. Optionally, and in some embodiments preferably, the pair of strain gauge sensors $R_i$ and $R_2$ formed on the top side of the tube 11 can be substantially aligned with the pair of strain gauge sensors $R_3$ and $R_4$ formed on the bottom side of the tube 11 i.e., $R_i$ can substantially overlap $R_4$, and $R_2$ can substantially overlap $R_3$. The measurement terminals 14 of each pair of strain gauges are adjacently located to form respective top and bottom measurement reading zones, 12t and 12b. Accordingly, in this specific and non-limiting example, the wavy patterns 7 of each pair of strain gauge sensors extends in opposite directions away from the respective measurement reading zone along the length of the tube 11 i.e., $R_1$ and $R_2$ extends away in opposite directions from the measurement reading zone 12t, and $R_3$ and $R_4$ extends away in opposite directions from the measurement reading zone 12b.

FIGS. 4A to 4D shows possible embodiments of tube devices having a circuitry unit 15 configured to sense the strain gauge elements $R_i$ and generate respective measurement signals/data. The circuitry unit 15 can be attached/fixed to the tube 11 over its measurement zones (12t and 12b in FIGS. 3A and 3B) for electrically coupling one or more circuitries 17 thereof to the measurement terminals (14 in FIGS. 1 and 3). In some embodiments the tube device is a PST and the circuitry unit 15 is configured to read the pressure and/or temperature sensors of the PST, to power its sensor elements (e.g., Wheatstone bridge), and to communicate data/signals with external devices/machinery utilizing the PST to conduct measurements.

FIG. 4A depicts a tube device 12' having two strain gauge elements, $R_2$ and $R_3$, substantially aligned along opposite sides of the tube 11, and a measurement unit 15 mounted over the measurement terminals (14, not shown) and having one or more circuitries 17 electrically coupled to the measurement terminals of the strain gauge elements for measuring their electrical resistances. The tube device 12' optionally includes a temperature sensor 12p electrically coupled to the measurement unit 15 configured and arranged to measure temperature inside the tube 11. Although not shown, the temperature sensor 12p can be added in any of the embodiments disclosed herein and shown in the figures.

In this embodiment the measurement unit 15 comprises an antenna element 18 configured and arranged to power the sensor tube device (e.g., by energy harvesting), and/or to communicate signals to and from the circuitry unit 15, such as, but no limited to, measurement data/signals and/or instructions. Accordingly, the circuitry unit 15 can use the antenna element 18 to wirelessly transmit the data/signals measured by the strain gauge elements of the tube device by its one or more circuitries 17 to external devices/machinery (not shown), and optionally receive instructions and/or data from the external devices/machinery. The circuitries 17 can be configured to carry out analog signal conditioning (e.g., signal amplification), analog-to-digital (A/D) and/or digital-to-analog (D/A) signals conversion, energy harvesting, power supply, store data and/or instructions and/or calibration information in memory elements thereof, trimming elements for the sensors, etc. The antenna element 18 can be a type of radio frequency (RF) antenna suitable for operating the sensor tube e.g., using RFID, NFC, Bluetooth, BLE (Bluetooth low energy), or utilizing any other RF protocol/device i.e., configured to provide electrical power supply to the one or more circuitries 17 by harvesting the electromagnetic radiation of external RF transmissions. Alternatively, or additionally, the circuitry unit 15 can comprise contact pads 15p, shown in FIG. 4D, for provision of electrical power supply from, and/or communicating data/signals with, the external devices/machinery.

In some embodiments the circuitry unit 15 of the sensor tube comprises calibration data 19 readable by external devices/machinery (not shown) utilizing the sensor tube 12'/12 to carry out measurements, thereby enabling the external devices/machinery to calibrate the measurement data/signals received from the circuitry unit 15. The calibration data 19 can be stored in a digital memory device (e.g., part of circuitries 17) accessible by the one or more circuitries 17, which can be configured to transmit the calibration data via the antenna element 18 to external devices/machinery, or communicate it to the external devices/machinery via contact pads (15*p*). Alternatively or additionally, the one or more circuitries 17 can be configured to read and use the calibration data 19 for making any needed adjustments to the measurements obtained from the sensor elements, and output calibrated measurement data.

Alternatively or additionally, the calibration data 19 may be provided on/in an optical readable medium, in this specific example, in a form of a QR barcode. The provision of the calibration data readily available for read by the external devices/machinery can be carried out using any suitable calibration technique followed by storing the calibration data on or in the sensor tube device using any of the techniques disclosed herein.

Figure 4B:
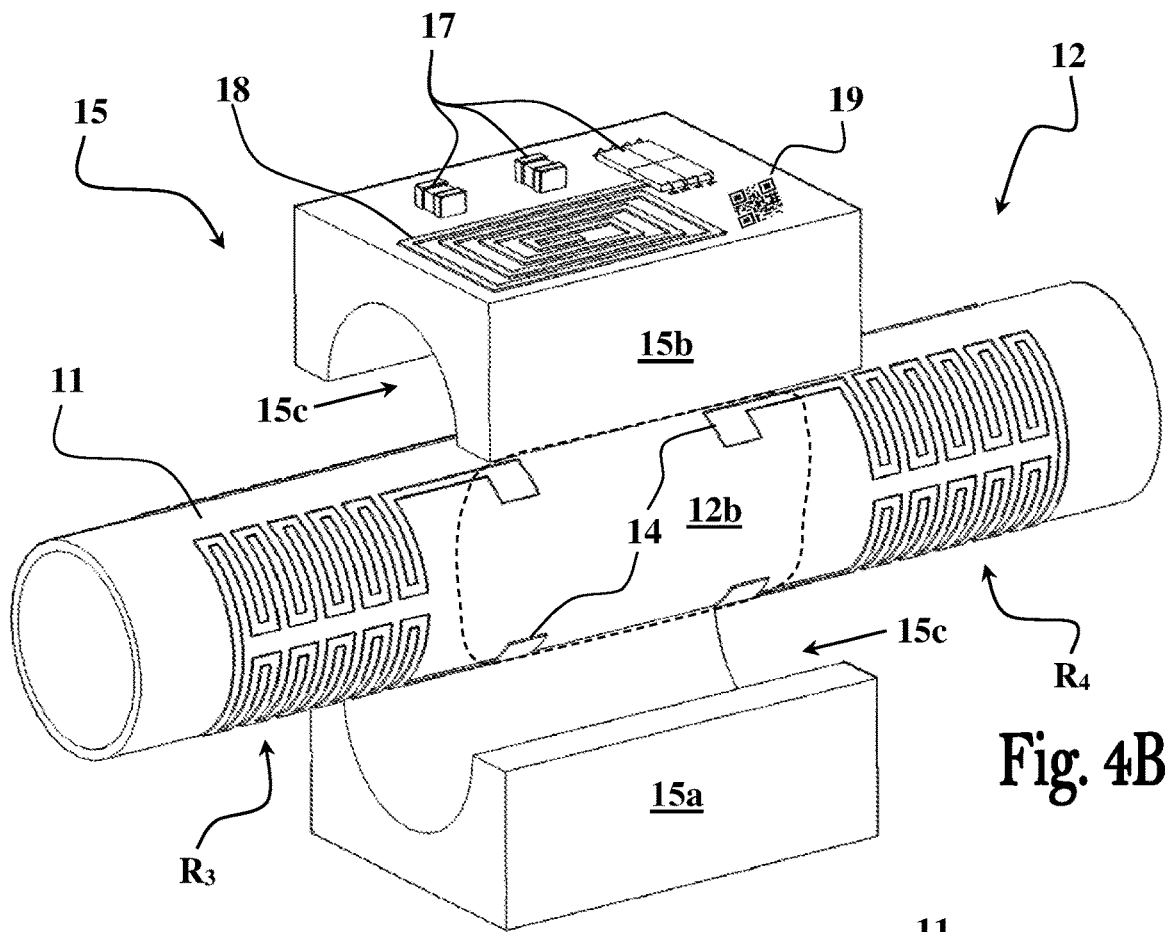
Figure 4C:
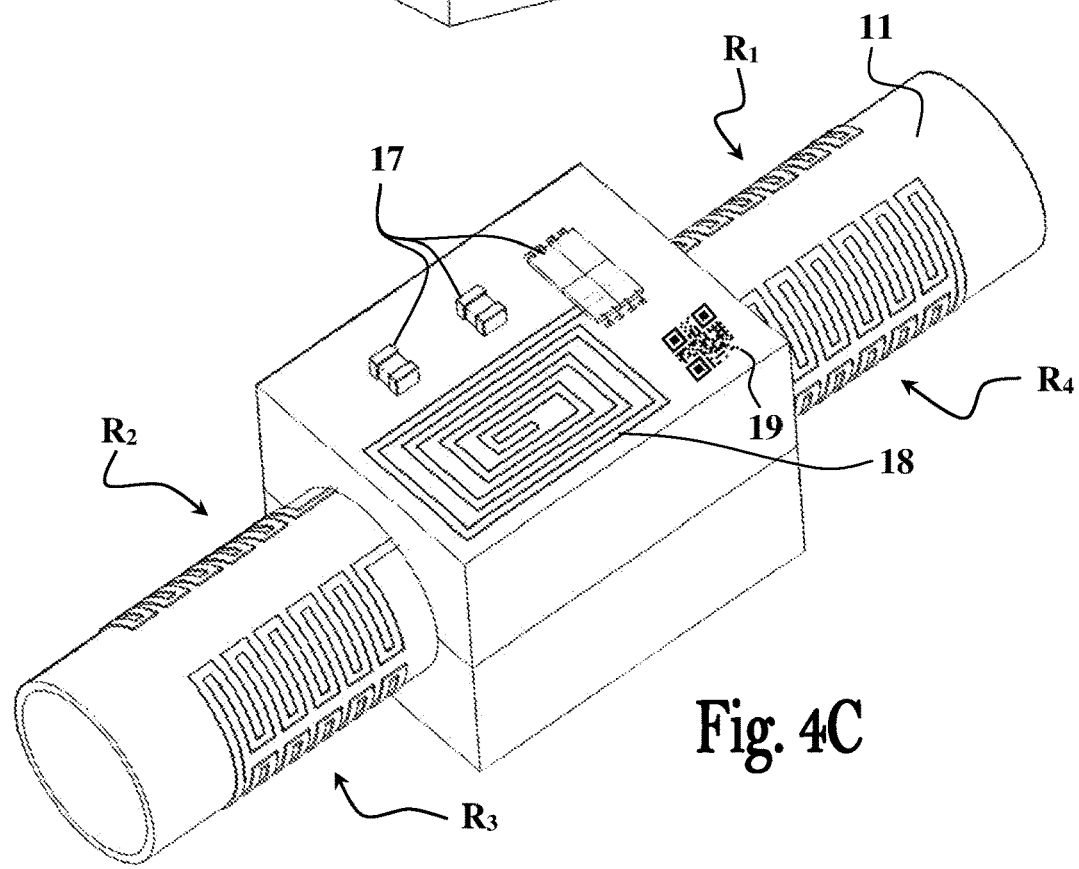
Figure 4D:
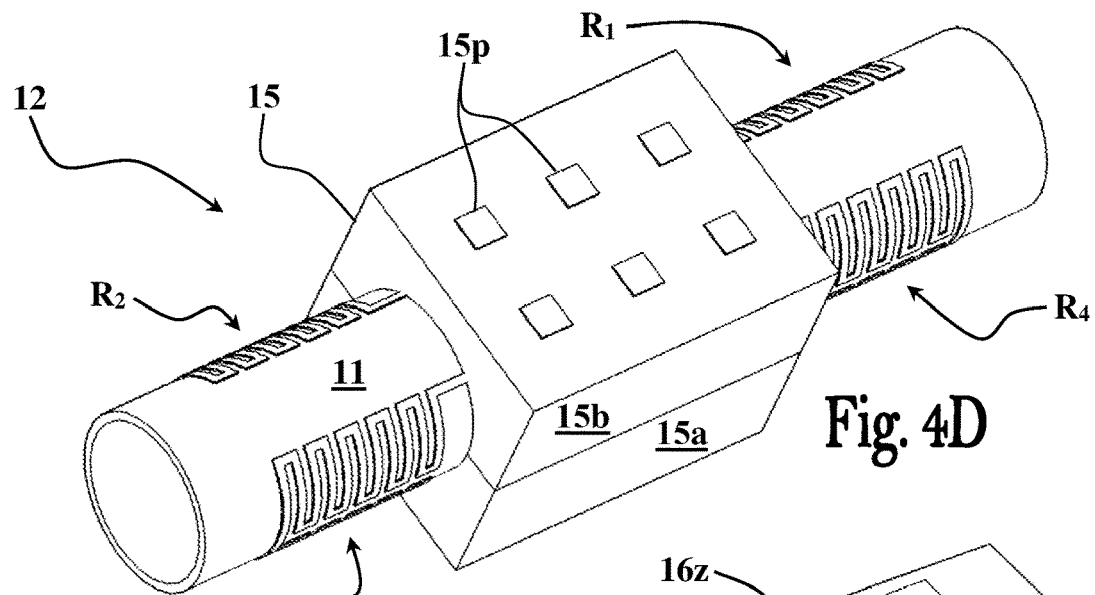

FIGS. 4B and 4C show mounting of the measurement unit 15 having two connectable shell elements, 15*a* and 15*b*, over the measurement zones of the sensor tube 12 having four strain gauge elements, $R_i$ (i=1, 2, 3, 4). In this specific and non-limiting example the shell elements, 15*a* and 15*b*, are generally rectangular-shaped elements each having an open channel 15*c* configured and arranged to fit over the tube 11 and receive a portion thereof therein. In the mounted state seen in FIGS. 4C and 4D, each shell element 15*a*/15*b* is engaged with one measurement terminal 14 of each strain gauge element $R_i$. The electrical connection between one or more circuitries 17 and the measurement terminals 14 of the sensor element can be achieve by electrical interfacing pads (not shown) provided on inner walls of the open channels 15*c* and electrically connected to the one or more circuitries 17 by electrically conducting lines (not shown) passing on, or in, the shell elements 15*a*/15*b*.

As seen, the measurements can be carried out on several different locations on the tube 11, that can be electrically connected to a single readout port of the circuitry unit 15, where different sensing elements on the tube 11 can be connected to the same circuitry unit 15 e.g., where R1 and R4 form a first couple of sensing elements, and R2 and R3 form a second couple. Reference measurements can be made at other locations on the tube 11 and also on the measurement unit 15 (e.g., to compensate temperature changes). In some embodiments the measurement unit 15 is configured to form a Wheatstone bridge from the strain gauge elements $R_i$, and to conduct at least some of the needed measurements using the formed Wheatstone bridge.

Figure 5A:
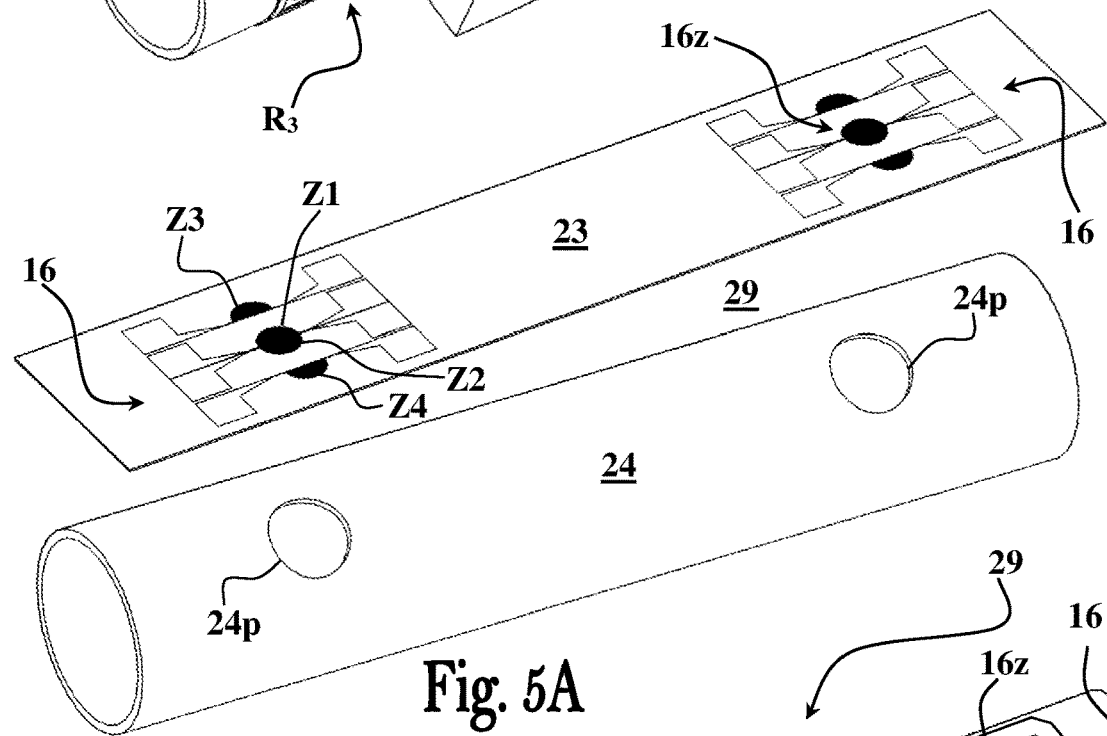

FIGS. 5A to 5E schematically illustrate sensor arrangements 29 configured according to some possible embodiments for attachment (e.g., by laser welding, gluing, ultrasonic welding) on external surfaces of tubes 24, which are not essentially flexible or elastic, and that can be made from substantially rigid materials. FIG. 5A is an exploded view showing the sensor arrangement 29 before attachment of the sensor elements to the tube 24. In these embodiments one or more sensor arrangements 16, such as illustrated in FIG. 2C, are patterned on, or attached to, a thin flexible/elastic sheet 23 (e.g., thin foil or film), and respective one or more opening/bores 24*p* are formed in the tube 24. The one or more sensor arrangements 16 are arranged on the sheet 23 such that at least one sensing element of each sensor arrangement 16 is located over one of the openings/bores 24*p*.

Figure 5B:
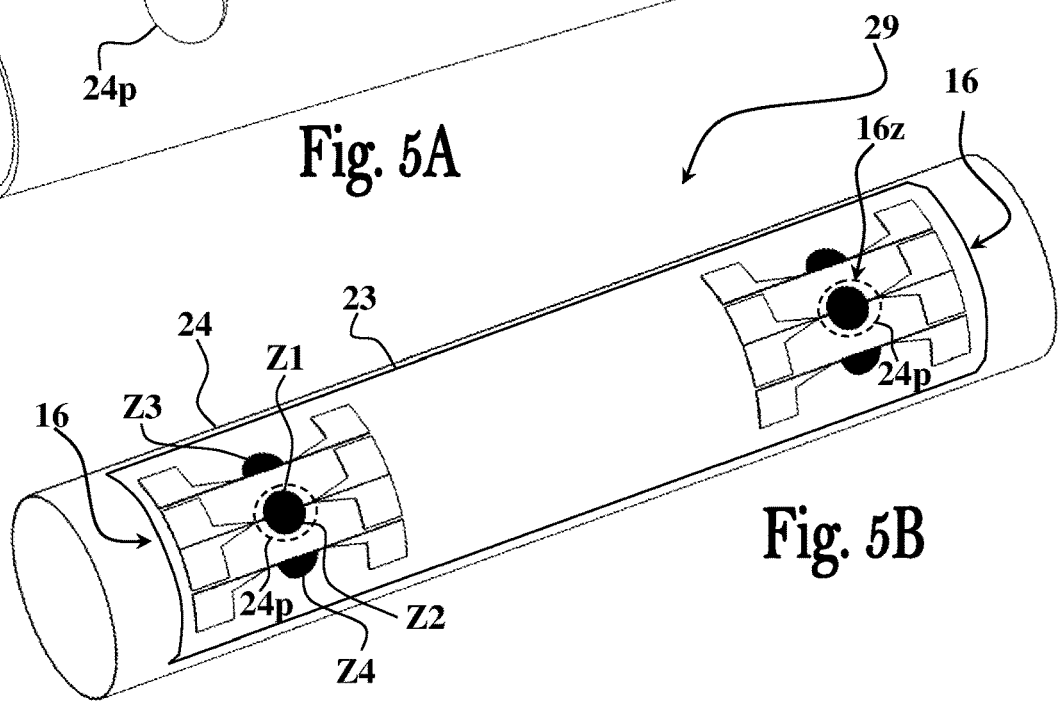

FIG. 5B is a perspective view showing the sensor arrangement 29 after attachment of the flexible/elastic sheet 23 to the tube 24. The sheet 23 is attached over and sealably closes the openings/bores 24*p* to permit introducing fluids thereinto. When fluid substance(s) are introduced into the tube 24, measurable properties, such as electrical resistance, of the at least one sensor element located over an opening/bore 24*p* are changed due to interaction of the introduced fluid with the portion of the sheet 23 located over the opening/bore 24*p*, thereby allowing to measure one or more properties and/or conditions of the fluid, such as, but not limited to, fluid pressure, flow rate, and/or temperature.

In this specific and non-limiting example, the tube 24 comprises two openings/bores 24*p*, and the flexible/elastic sheet 23 comprises two respective sensor arrangements 16. Optionally, and in some embodiments preferably, the sensor arrangements 16 are arranged on the sheet 23 such that the circular sensor arrangement 16*z* comprising the two inner sensor element Z1 and Z2, of each sensor arrangement 16 is located over an opening/bore 24*p* of the tube 24. In this configuration measurable properties of the inner sensor elements, Z1 and Z2, located over an opening/bore 24*p* of the tube 24, are subject to changes when fluid substance(s) are introduced/streamed through the tube 24. The outer sensor elements Z3 and Z4, positioned on surface areas of the flexible/elastic sheet 23 that don't interact with the fluid substance(s), are substantially not influenced by the fluid substance(s) introduced/streamed through the tube 24, and thus used in some embodiments as reference sensors/elements. Optionally, the sensor elements Z1, Z2, Z3 and Z4, are implemented on both sides of the flexible/elastic sheet 23, to form a full Wheatstone bridge, as described and illustrated in International Patent Application No. PCT/IL2018/050690 and/or in U.S. Provisional Patent Application No. 62/782,538, of the same applicant hereof, the content of which is incorporated herein by reference.

The flexible/elastic sheet 23 can be a type of thin foil/film made from PEEK (polyether ether ketone), ULTEM, polycarbonate, polyimide, PET (Polyethylene Terephthalate), PEN (polyethylene naphthalate), or any other suitable polymer, and the electrically conducting elements of the sensor arrangement 16 can be prepared from Nickel-Chrome alloys, Nickel-Copper alloy, gold, platinum, and any other piezo-electric or piezo-resistive material by lamination, sputtering or evaporation combined with lithography techniques. In some embodiments additional electrical elements e.g., antenna element 18 and/or circuitries 17 shown in FIG. 4C, can be mounted/formed in the flexible/elastic sheet 23.

Figure 5C:
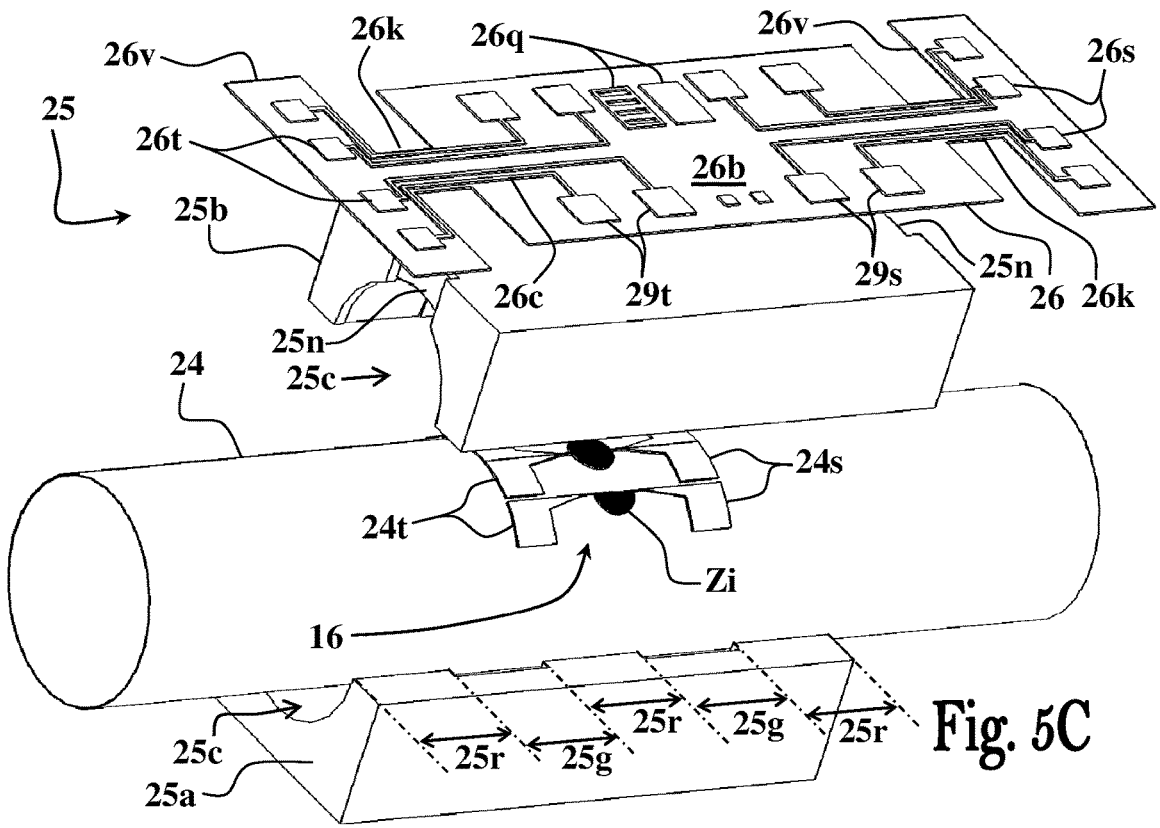
Figure 5D:
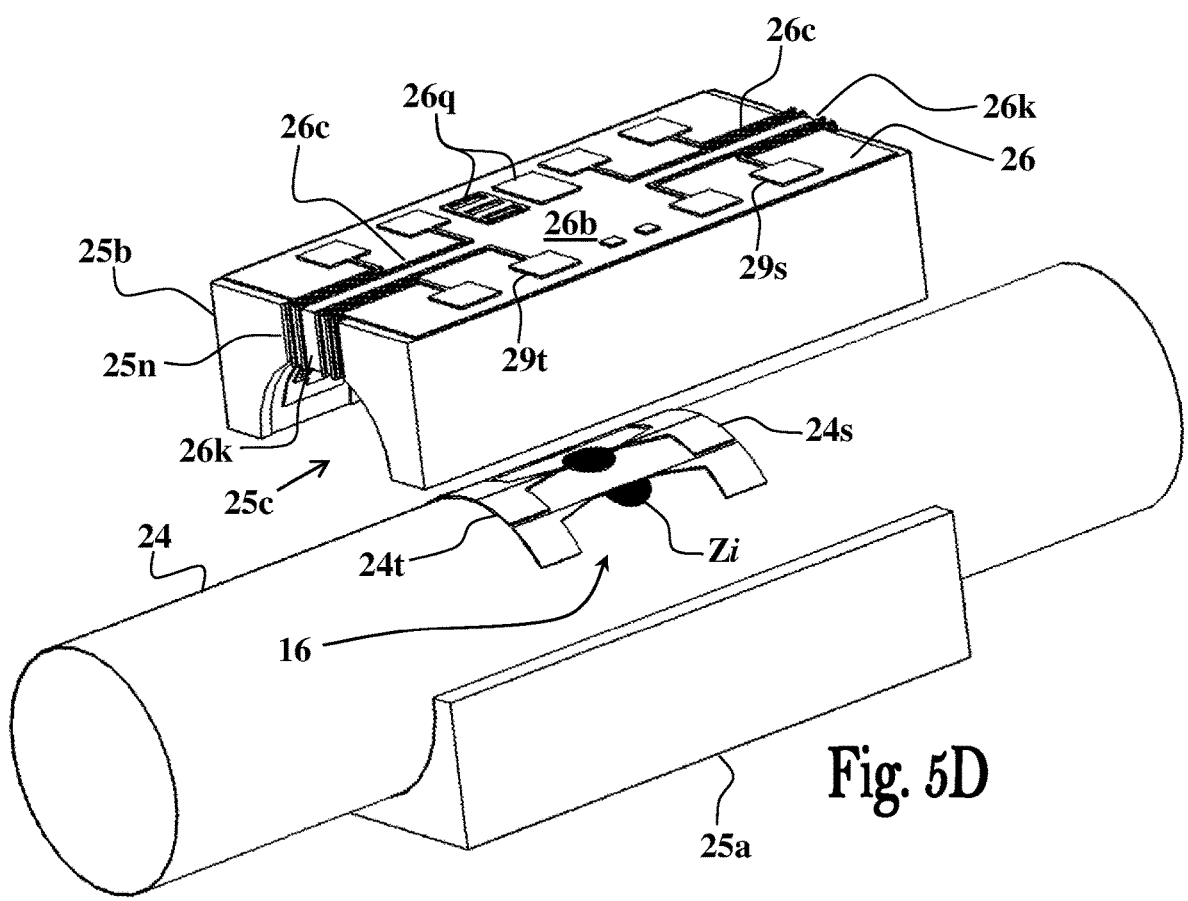
Figure 5E:
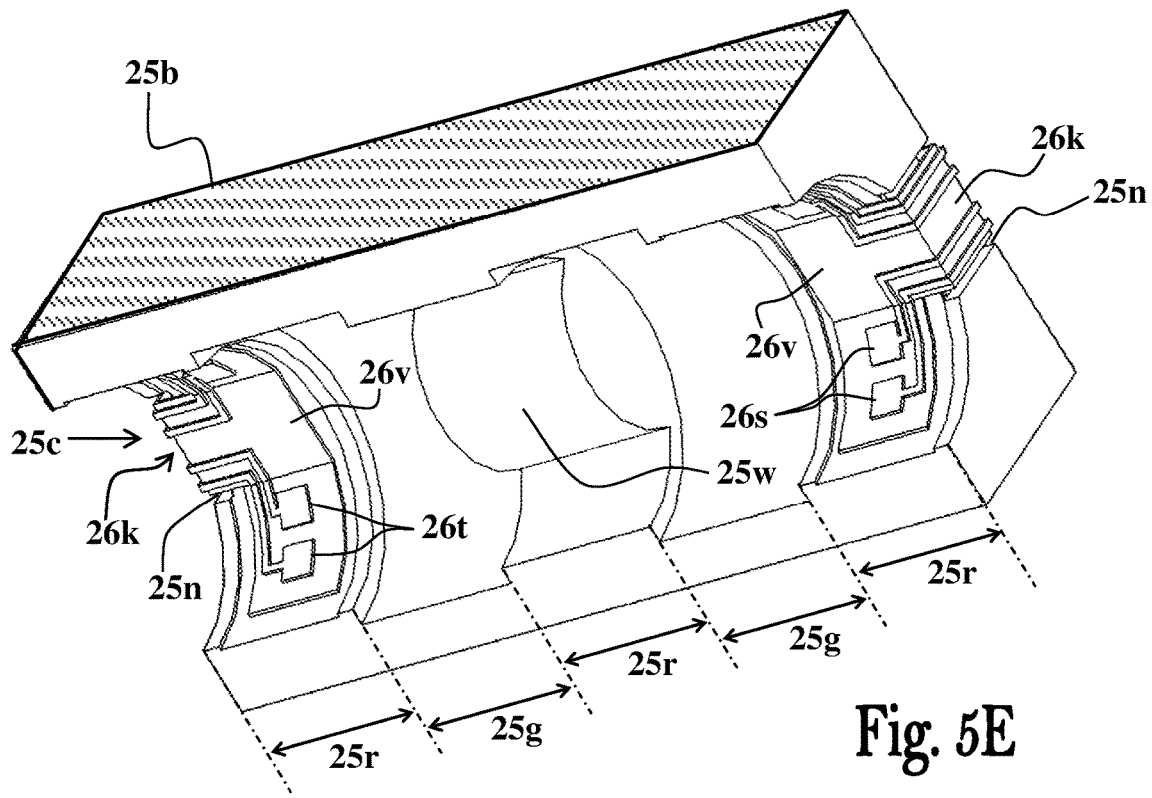

FIGS. 5C to 5E illustrate a coupling technique configured for electrically interfacing to the sensor arrangement 16 attached to the tube 24 via an interfacing unit 25 comprising two shell elements, 25*a* and 25*b*, and a flexible or elastic sheet 26 attached thereto and comprising one or more interfacing circuitries. The shell elements 25*a* and 25*b* can be configured very similar to the shell elements 15*a* and 15*b* described hereinabove with reference to FIGS. 4A to 4D, and thus will not be described in details for the sake of brevity. The flexible/elastic sheet 26 can comprise contact pads 29*t*/29*s* 26*t*/26*s* and/or circuitries 26*q* (surface mount devices—SMD components—trimming elements, electronic integrated circuit—IC, and/or any other passive or active electronic component/device) configured for reading measurement data/signals from the sensor elements (e.g., pressure and/or temperature), powering the sensor elements/arrangement (e.g., Wheatstone bridge), and/or communicating data and/or control signals with external devices/equipment (not shown) utilizing the sensor arrangement 16.

More particularly, the main body 26*b* of the flexible/elastic sheet 26 comprises contact pads 29*t* and 29*s*, and/or circuitries 26q, for contacting to the sensing elements Zi (i=1, 2, 3, 4) located on the tube 24, and/or for communicating data and/or control signals/data. Additional contact pads 26t and 26s, electrically coupled to electrical pads 29t and 29s, respectively, and/or to the electrical circuitries 26q, are provided on bendable interfacing segments 26v of the flexible/elastic sheet 26. The bendable interfacing segments 26v are located at anterior and posterior sides of the sheet 26, and they are configured in some embodiments to undergo a 180° bend for attachment over an underside, over a surface area of the open channel 25c, of the top shell element 25b. In some embodiments the bendable interfacing segments 26v are connected to the main body 26b of the sheet 26 by respective bendable neck sections 26k, that form two "T"-shaped segments anteriorly and posteriorly extending from the main body 26b of the sheet 26 before the bendable interfacing segments 26v are attached at the underside of the top shell element 25b.

In some embodiments each one of the upper shell elements 25b further comprises two vertical grooves 25n formed in posterior and anterior sides thereof, such that each vertical groove 25n communicates with one end of the open channel 25c of the upper shell elements 25b. The bendable neck sections 26k of the interfacing segments 26v comprise conducting lines 26c electrically connecting each contact pad 29t/29s of the main body to a respective contact pad 26t/26s of one of the interfacing segments 26v. During, or after, attaching the main body 26b of sheet 26 to the top shell element 25b, the neck sections 26k undergo a 90° bend for fitting and/or attaching them into a respective vertical grooves 25n of the top shell element 25b, and the interfacing segments 26v then undergo a further 90° bend for attaching them over underside surface areas in the open channel 25c of the top shell element 25b.

The flexible/elastic sheet 26 can be a type of thin foil/film made from PEEK, ULTEM, polycarbonate, polyimide, PET, PEN, or any other suitable polymer, and the electrically conducting elements patterned/attached thereon can be prepared from copper, gold, by lamination, sputtering or evaporation combined with lithography techniques. The shell elements, 25a and 25b, can be fabricated from any polymeric material by injection molding, 3D printing or any other suitable plastic manufacturing technique.

The tube 24 is placed inside the open channel 25c of the bottom shell element 25a such that the sensor assembly 16 is upwardly located and aligned for contacting contact pads 26t/26s of the interfacing segments 26v attached to the open channel 25c of the top shell element 25b. The top shell element 25b is then attached to the bottom shell element 25a, thereby enclosing the tube 24 therewithin and electrically contacting each contact pad 26t at one side of the open channel 25c with a respective contact pad 24t of the sensor arrangement 16, and contacting each contact pad 26s at the other side of the open channel 25c with a respective contact pad 24s of the sensor arrangement 16. In this way, after attaching the shell elements 25a and 25b one to the other, with the tube 24 properly aligned therebetween, an electrical connection is established between each contact pads 29t on the main body 26b and a respective contact pad 24t at one side of the sensor arrangement 16, and an electrical connection is established between each contact pad 29s on the main body 26b and a respective contact pad 24s at the other side of the sensor assembly 16, thereby enabling reading measurements of the sensing elements Zi attached to the tube 24 via pairs of contact pads 29t-29s of the main body 26b of the sheet 26 located on the top shell element 25b.

It is noted that the electrical connection between the contact pads 29t and 29s of the main body 26b and the 26 and the contact pads 24t and 24s of the sensor assembly 16, can be similarly established without the bottom shell element 25a, which is mainly provided for securing the interfacing unit 25 to the tube 24.

In some embodiments the open channels 25c of the shell elements comprises tube support arcs 25r formed therein configured to contact and accurately enclose the tube therebetween when the shell elements are attached one to the other, and thereby maintain a grip thereover. In this specific and non-limiting example three spaced apart support arcs 25r are formed in each open channel, thereby forming corresponding contact-free arcs 25g therebetween in each open channel 25c. The contact-free arcs 25g are configured to form circular zones around the tube 24 in which a substantially constant gap is maintained between the tube 24 and the shell elements 25a and 25b wherein deformations of the sheet 23 can occur when fluid is introduced into the tube.

Figure 5F:
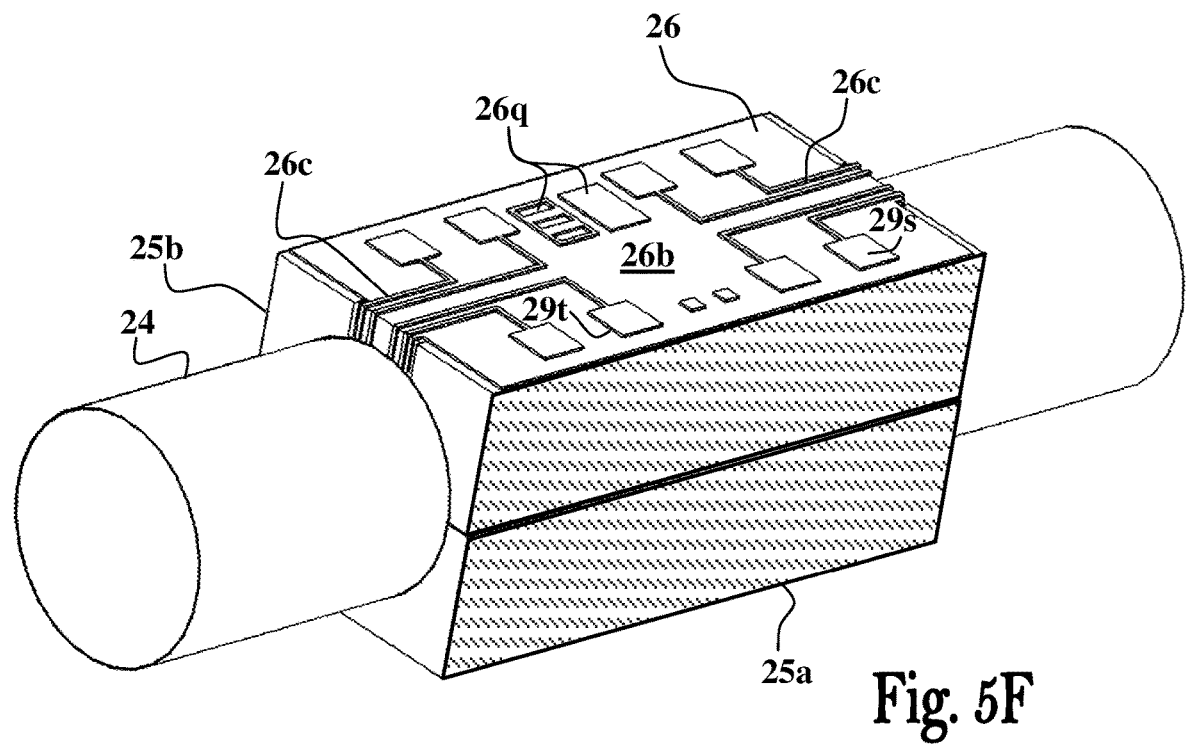

As shown in FIG. 5E, the interfacing segments 26v of the elastic sheet 26 can be attached over respective anterior and posterior sides support arcs 25r of the top shell element 25b. Optionally, and in some embodiments preferably, a protrusion 25w is formed in at least one of the open channels 25c to form a flow restriction/constriction inside the tube 24 when the shell elements are attached one to the other. In this specific and non-limiting example protrusion 25w is formed on a central support arc 25r of the top shell element 25b. FIG. 5F shows a perspective view of the sensor arrangement after it is assembled on the tube 24. The circuitries 26q may comprise in some embodiments fine and/or coarse trimming grids for calibrating the sensor elements/circuitry, such as described in international patent publication No. WO 2018/092130, of the same applicant hereof, the disclosure of which is incorporated herein by reference. Optionally, the trimming is carried out when the sensor if fully assembled.

In some embodiments the conducting lines 26c, and/or the contact pads 29t/29s, and/or 26t/26s are directly patterned (e.g., printed) on the shell element 25b. Respective vias (not shown) can be formed in the shell element 25b to electrically connect between the contact pads 29t and 26t, and/or between the contact pads 29s and 26s, formed on the top and bottom sides of the shell element 25b. Accordingly, if such vias are used in the shell element 25b, at least some, or all, of the conducting lines 26c can be eliminated, and accordingly the flexible/elastic sheet 26 is not needed.

Figure 6:
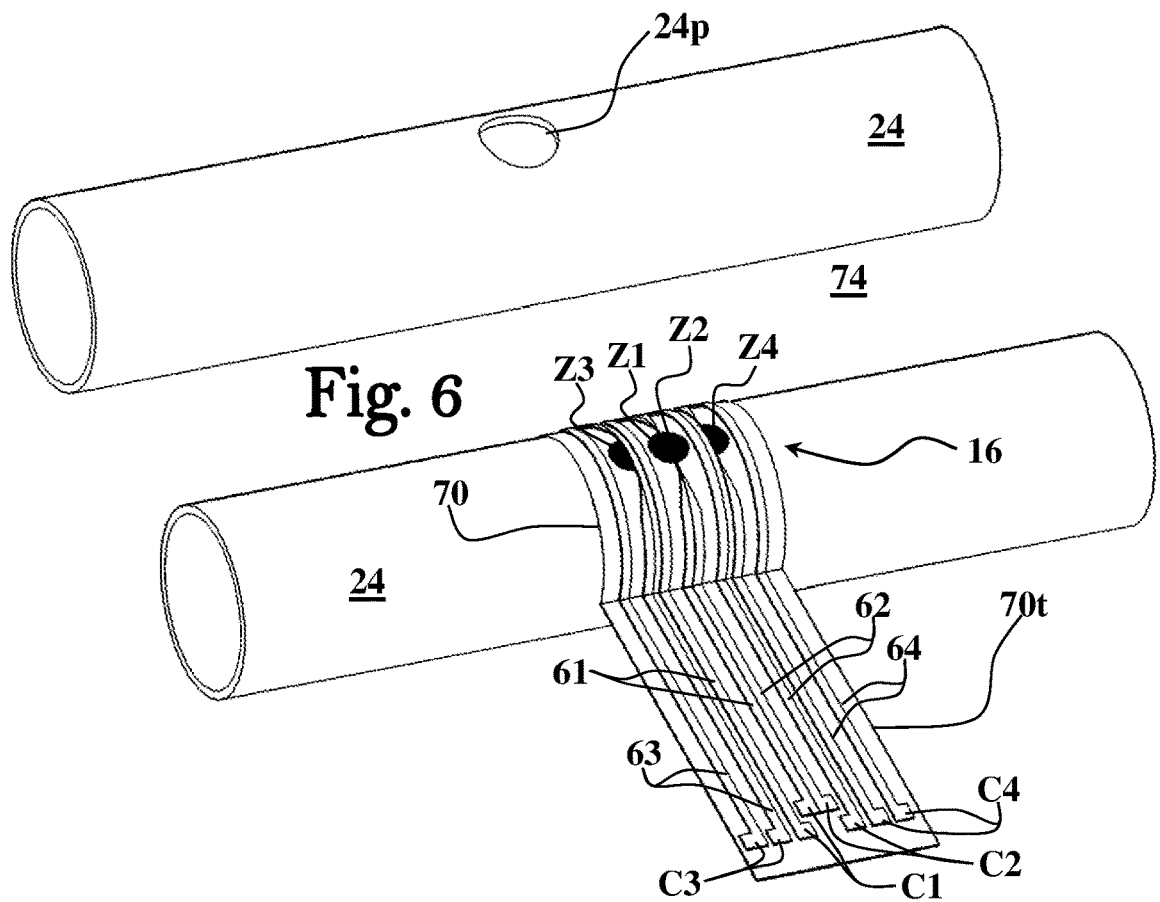
FIG. 6 schematically illustrates a sensor arrangement configured according to some possible embodiments for attachment on tubes and comprising an electrical interface embedded therein.

FIG. 6 schematically illustrates a sensor assembly of a tube device 74 configured according to some possible embodiments for attachment on a tube 24 (e.g., by glue, laser welding, ultrasonic welding), which is not essentially flexible or elastic, and that can be made from substantially rigid materials. The tube 24 comprises at least one bore/opening 24p that is sealably covered and closed by an elastically deformable sheet 70 (e.g., thin film or foil, or a flexible printed circuit board) comprising one or more sensing elements Zi (where i>0 is appositive integer) patterned or attached thereto. The deformable sheet 70 is attached to the tube 24 such that at least one of the sensor elements Zi is placed over the opening/bore 24p. Thus, when fluid substance(s) is introduced into the tube 24 measurable properties (e.g., electrical resistance) of the at least one sensor element Zi placed over the opening/bore 24p are affected and changed due to interaction of the fluid(s) with the portion of the deformable sheet 70 covering the opening/bore 24p.

The deformable sheet 70 can be an elongated element having at one end portion thereof the sensor assembly 16 comprising the at least one sensor element Zi, a plurality of conducting lines, 61, 62, 63 and 64, passing therealong, and a plurality of contact pads Ci at another end portion thereof 70t. In some embodiments at least the end portion 70t of the deformable sheet 70 is free i.e., it is not attached to the tube. The sensor arrangement 16 can be configured such that only the two inner sensing elements, Z1 and Z2, are placed on the portion of the flexible sheet 70 sealably covering the opening 24p, for implementing a bridge circuitry (e.g., a Wheatstone bridge) having two reference sensing elements, Z3 and Z4, that are not affected by the fluid introduced into the tube 24. The sensing elements and conductive elements can be formed on both sides of the deformable sheet 70 to implement a full Wheatstone bridge, as described and illustrated in international patent application No. PCT/IL2018/050690.

The sensor assembly 74 is designed such that two parallel electrically conducting lines extends longitudinally from each from each sensor element Zi and provide electrical connection to its terminals via a respective pair of contact pads formed at their ends. Particularly, the contact pads C4 provide electrical connection to sensor element Z4 via conducting lines 64, the contact pads C2 provide electrical connection to sensor element Z2 via conducting lines 62, the contact pads C1 provide electrical connection to sensor element Z1 via conducting lines 61, and the contact pads C3 provide electrical connection to sensor element Z3 via conducting lines 63.

Figure 7A:
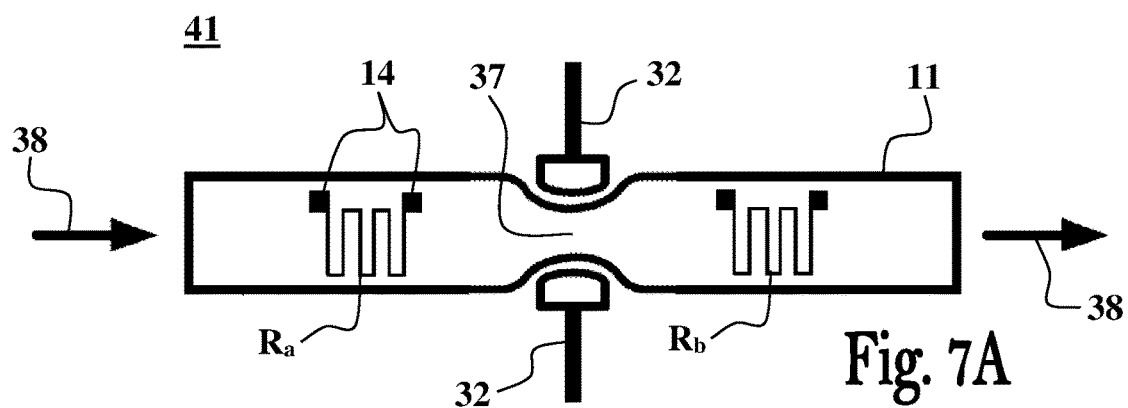
FIGS. 7A to 7D schematically illustrate possible sensor tubes setups according to some possible embodiments, wherein FIG. 7A demonstrates external formation of a constriction in a sensor tube, FIG. 7B demonstrates an internal constriction formed in a sensor tube, FIG. 7C demonstrates a sensor setup configured to define deformable and non-deformable areas in the tube, and FIG. 7D demonstrates a sensor setup configured to define deformable, non-deformable, and constriction, areas in the tube.
Figure 7B:
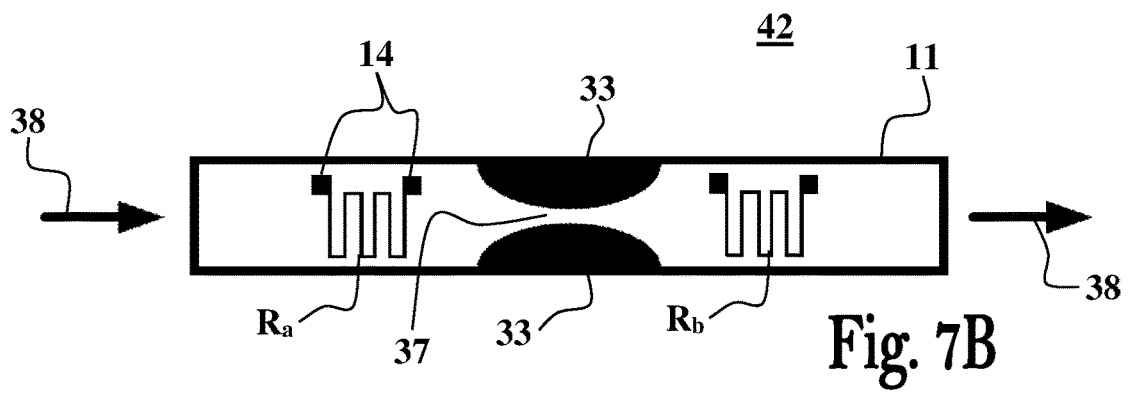

FIGS. 7A and 7B schematically illustrate possible embodiments of sensor tube devices, 41 and 42, having external and internal constrictions 37, respectively. By implementing a flow restrictor/constriction 37 within the tube 11, and measuring the pressure difference at both sides of the restrictor/constriction 37, flow rate of a stream of fluid 38 passing through the tube 11 can be measured. As shown in FIG. 4A, external clamping assembly 32 can be used to apply an external force and deform the walls of the tube 11 to internally collapse/bend a wall section of the tube 11 and form the internal constriction 37 (e.g., using one or more ring springs and/or any suitable Klamra/Crab Clamp press mechanism). Alternatively, or additionally, the constriction 37 can be implemented by an internal constricting bodies 33 attached or formed on a section of the internal wall of the tube 11 e.g., by heat compression, welding. In FIGS. 7A and 7B the pressure at one side of the constriction 37 is measured using the sensor element $R_a$ and the pressure at the other side of the constriction 37 is measured using the sensor element $R_b$. In some embodiments one or more of the sensor elements $R_a$ and $R_b$ are positioned over respective openings formed in the wall of tube 11, as exemplified in FIGS. 5A and 6.

Figure 7C:
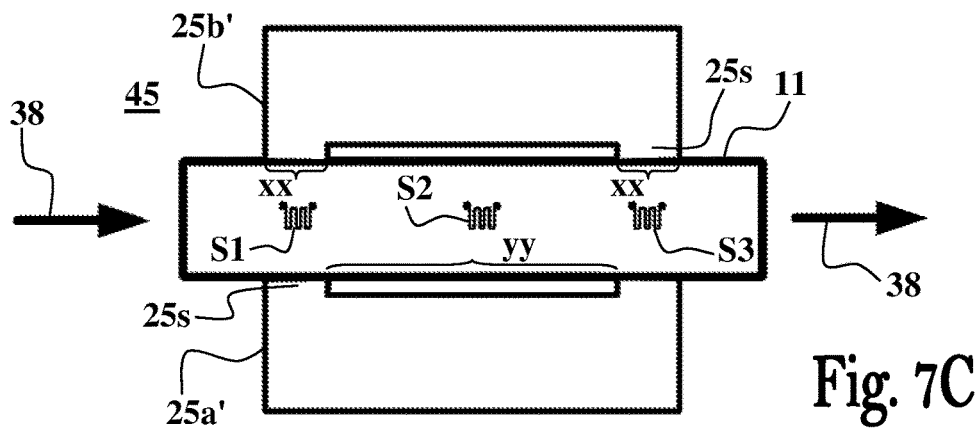

FIG. 7C shows a sensor tube setup 45 utilizing shell elements 25a' and 25b' configured to define tube support sections xx in which the tube 11 is contacted and firmly enclosed by support members 25s of the shell elements, and a tube section yy defined between the support members 25s in which a substantially constant gap is maintained between the tube 11 and the shell elements to permit deformations of the tube walls. Accordingly, the sensor arrangement S2 is located on unsupported section yy of the tube 11, and thus subject to elastic deformations of the tube, and the sensor arrangements S1 and S3 are located on supported sections xx of the tube which are made substantially non-deformable, and thus the sensor arrangements S1 and S3 can thus be used as reference elements. The Support members 25s can further serve to prevent bends/twists along the tube section comprising the sensor arrangements, and in case the sensor arrangements are formed/attached to a flexible/elastic sheet attached to the tube, to also prevent detachment of the flexible/elastic sheet from the tube 11. In some embodiments one or more of the sensor arrangements S1, S2 and S3, are positioned over respective openings formed in the wall of tube 11, as exemplified in FIGS. 5A and 6.

Figure 7D:
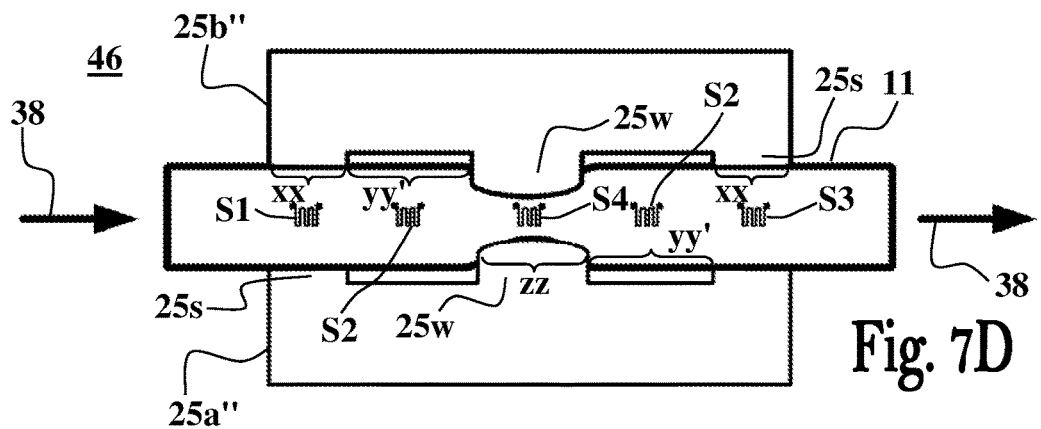

FIG. 7D shows a sensor tube setup 46 utilizing shell elements 25a" and 25b" configured to define tube support sections xx in which the tube 11 is contacted and firmly enclosed by support members 25s of the shell elements, a tube section in which the protrusions 25w formed inside the shell elements forms a constricted tube section zz, and tube sections yy' defined between the support members 25s and the protrusions 25w in which a substantially constant gap in maintained between the tube 11 and the shell elements to permit deformations of the tube walls. In this example the sensor arrangements S2 located in the unsupported sections yy' of the tube are subject to elastic deformations of the tube 11, the sensor arrangement S4 located in the constricted section zz of the tube 11 is subject to elastic deformations of the constricted section of the tube, and the sensor arrangements S1 and S3 are located on the supported sections xx of the tube which is made substantially non-deformable, and thus can be used as reference elements. The support members 25s can further serve to prevent bends/twists along the tube section comprising the sensor arrangements, and in case the sensor arrangements are formed/attached to a flexible/elastic sheet attached to the tube, to also prevent detachment of the flexible/elastic sheet from the tube 11. In some embodiments one or more of the sensor arrangements S1, S2, S3 and S4, are positioned over respective openings formed in the wall of tube 11, as exemplified in FIGS. 5A and 6.

Figure 8A:
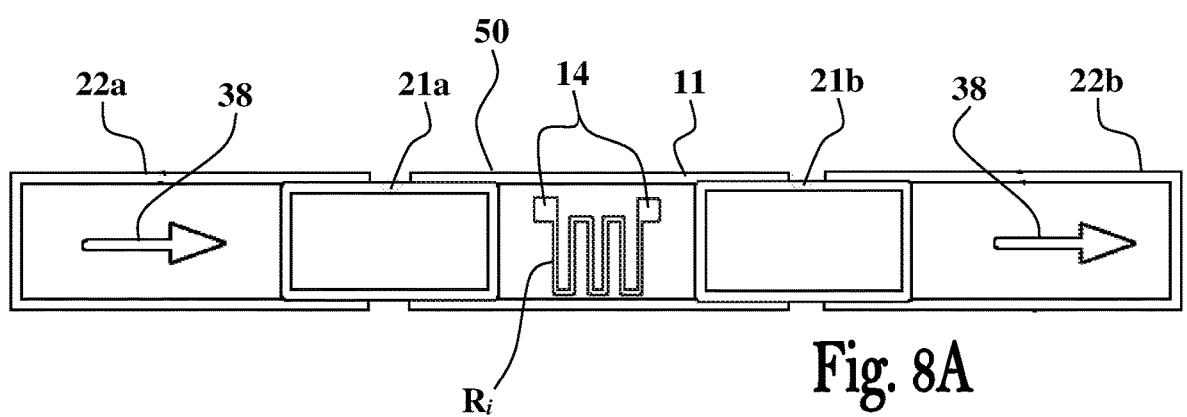

FIG. 8A shows a sectional view of a sensor tube device 50 having one or more sensor elements $R_i$ and two connectors, 21a and 21b, at opposite sides of the tube 11. The connectors 21a and 21b are preferably a type of quick connectors, such as but not limited to, Luer-lock connectors. In this example, the connector 21a serves as a fluid inlet for receiving a fluid stream 38 from an external source via conduit 22a sealably connected thereto, and the connector 21b serves as a fluid outlet for discharging the fluid stream 38 via the conduit 22b sealably connected thereto. In this way the strain gauges $R_i$ can be implemented on a designated tube 11 having specific predefined parameters to form a tube sensor device 50, and regular conduits 22a and 22b can be connected to the sensor tube device 50 during the manufacturing process, or later on by respective connectors 21a and 21b, to form a continuous fluidic tube element with integrated measurement elements $R_i$. A constriction can be applied external and/or internal to the tube 11, as exemplified in FIGS. 7A and 7B. In some embodiments one or more of the sensor arrangements $R_i$ are positioned over respective openings formed in the wall of tube 11, as exemplified in FIGS. 5A and 6.

Figure 8B:
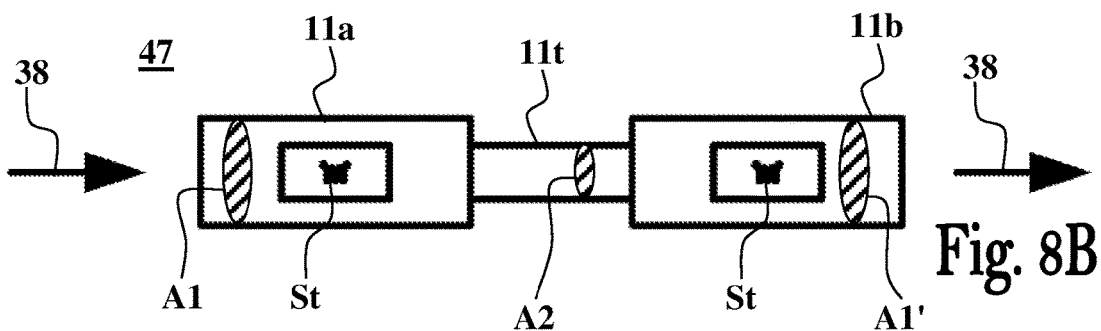

FIG. 8B demonstrates construction of a flow rate sensor using two tubes 11a and 11b, each having a predetermined cross-sectional area, A1 and A1' respectively, and a sensor arrangement St attached/patterned thereon using any one of the techniques disclosed hereinabove, and a constriction tube 11t having a smaller cross-sectional area A2 connecting between the two tubes 11a and 11b (i.e., A2<A1). In this example the sensor arrangement St of tube 11a can measure the fluid pressure of the fluid stream 38 coming from a fluid source (not shown), and the sensor arrangement St of tube 11b can measure the fluid pressure of the fluid stream 38 received from the constriction tube 11t, and the two measured pressures can be sued to determine the flow rate of the fluid flow 38 based on the cross-sectional areas A1 and A2 of the tubes.

Figure 9B:
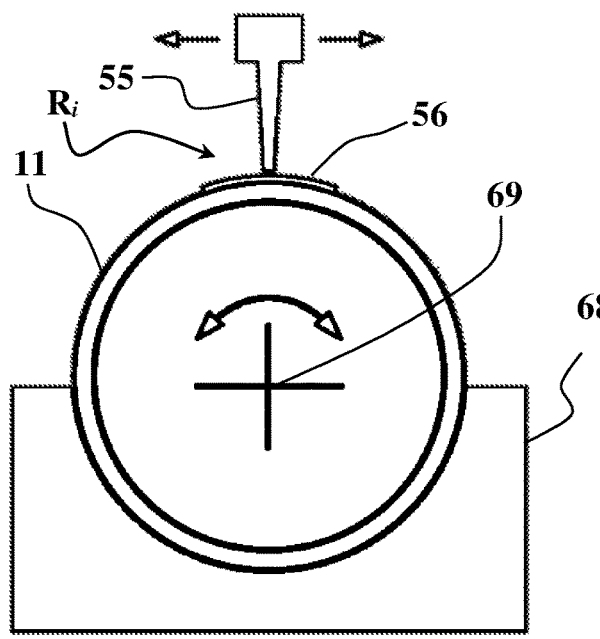
Figure 9A:
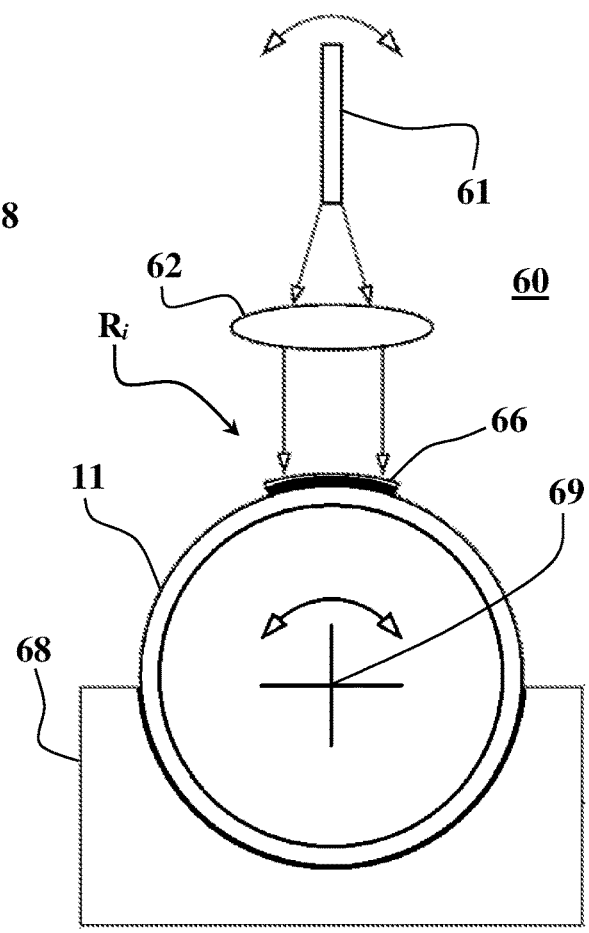

FIG. 9A is a schematic cross-sectional illustration of formation of strain gauge $R_i$ directly on the tube 11 by deposition of metal lines 66 directly on the tube 11 using lithography or direct laser writing. In this specific and non-limiting example a laser source 61 and optical system comprising one or more lenses 62 are used to deposit the electrically conducting lines (metallic or any other conducting material) 66 on an external area surface of the tube 11 e.g., using additive and/or subtractive manufacture process. Optionally, and in some embodiments preferably, the tube 11 and/or the laser source 61 are rotated relative to the tube center 69. Alternatively, or additionally, the lenses 62 can be tilted and/or moved to divert the direction of the laser beams onto desired locations on the external surface of the tube 11. The tube 11 can be attached to a rotatable mandrel (not shown) and/or engaged in a support element 68 configured to rotate the tube 11 about its center axis 69.

FIG. 9B is a schematic cross-sectional illustration of formation of strain gauge $R_i$ directly on the tube 11 by inkjet printing technique e.g., using electrically conductive inks with a 3D printer head 55 to form electrically conducting lines 56 on external surface areas of the tube 11. The printer head 55 can be configured to move and/or rotate in any suitable direction for applying the electrically conductive patterns 56. The tube 11 can be similarly attached to a rotatable mandrel (not shown) and/or engaged in a support element 68 configured to rotate the tube 11 about its center axis 69.

Figure 9C:
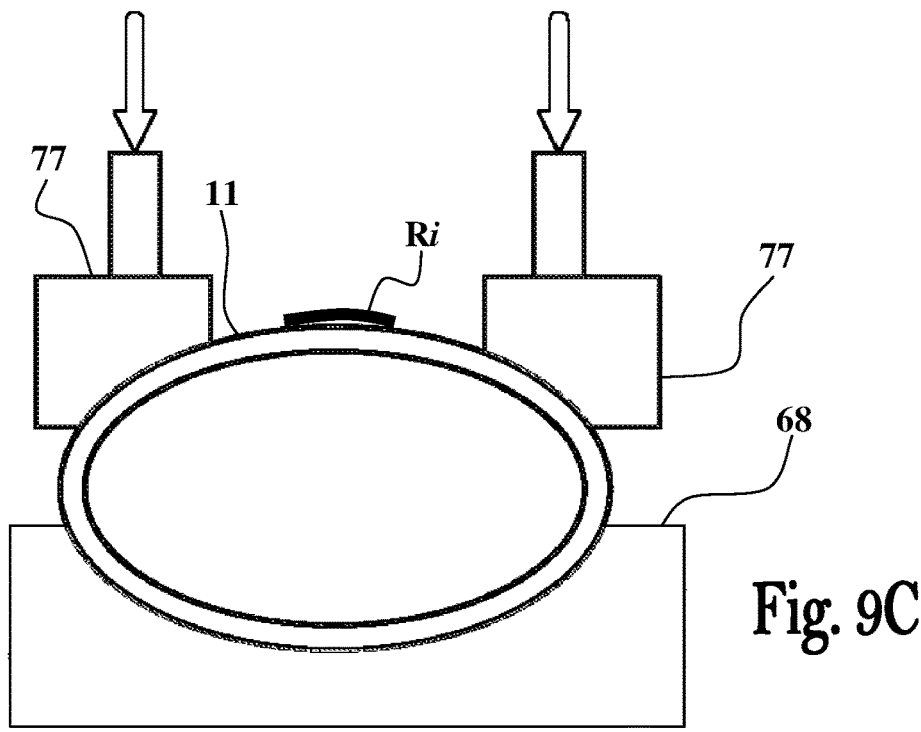

FIG. 9C is a schematic cross-sectional illustration of adjusting the shape of the tube 11 by squeezing/pressing the tube 11 during the deposition of the strain gauges $R_i$, to flatten the working area. Pressure application device 77 is used to temporarily deform the tube 11 while it is held by the support element 68, and at least partially flatten a portion of the wall of the tube 11 on which the strain gauge element(s) $R_i$ are patterned. The deformation of eh tube 11 can be performed by the pressure application device 77 to facilitate the deposition process by flattening surface areas of the tube 11, or deforming it into any desired shape/position. The tube wall flattening technique demonstrated in FIG. 9C is used in some embodiments to attach a deformable sheet with sensor/electric elements patterned/forms thereon on the tube e.g., by laser welding, ultrasonic welding, heat welding, gluing etc.

FIG. 10 schematically illustrates another option of implementing the sensor tube devices by laminating premade strain gauges $R_i$ on foil sleeve(s) 71 adapted to snugly fit over the tube 11. The laminating of the premade strain gauges $R_i$ can be carried out either by gluing, laser welding, heat welding, ultrasonic welding or by shrinkage of the foil sleeve(s) (e.g., by heat).

FIGS. 11A and 11B schematically illustrate testing/calibration of the sensor tube device(s) 80 according to some possible embodiments. Testing and/or calibration can be carried out shortly after patterning the strain gauge element(s) $R_i$ on the tubes 11, by applying a predefined pressure and/or fluid flow 38 through the tube 11, measuring corresponding signals via the probe terminals 85 of the strain gauge element(s) $R_i$ and generating corresponding calibration data based thereon. FIG. 11A shows calibration/testing of a single sensor tube 80 placed on a support 80s, by applying a predefined fluid stream/pressure 38 into the tube 11 (i.e., if pressure is to be applied the outlet of the tube 11 is sealed) and measuring corresponding signals over the strain gauge element $R_i$ via the probe terminals 85 electrically connected to the measurement terminals 14 of the strain gauge elements $R_i$. This setup can be similarly used to calibrate flow, temperature, and/or conductivity sensor elements.

As shown in FIG. 11B, in some embodiments an array 82, or a batch, of a plurality of tubes 11 is processed to simultaneously pattern/deposit the strain gauge elements $R_i$ on the tubes 11, and to calibrate/test the strain gauge elements $R_i$ simultaneously, or one by one, in order to optimize the fabrication process. FIG. 11B shows calibration/testing of the array (82) of sensor tubes 80 aligned in a spaced apart relationship on the support 82s while simultaneously applying a fluid pressure/steam 38 into all of the tubes 11 in the array 82. In this specific and non-limiting example the sensor tubes 80 are calibrated one at a time using a single pair of probe terminals 85, but a plurality of probe terminals 85 can be similarly used to simultaneously calibrate/test all of the sensor tubes 80 in the array 82.

Figure 12A:
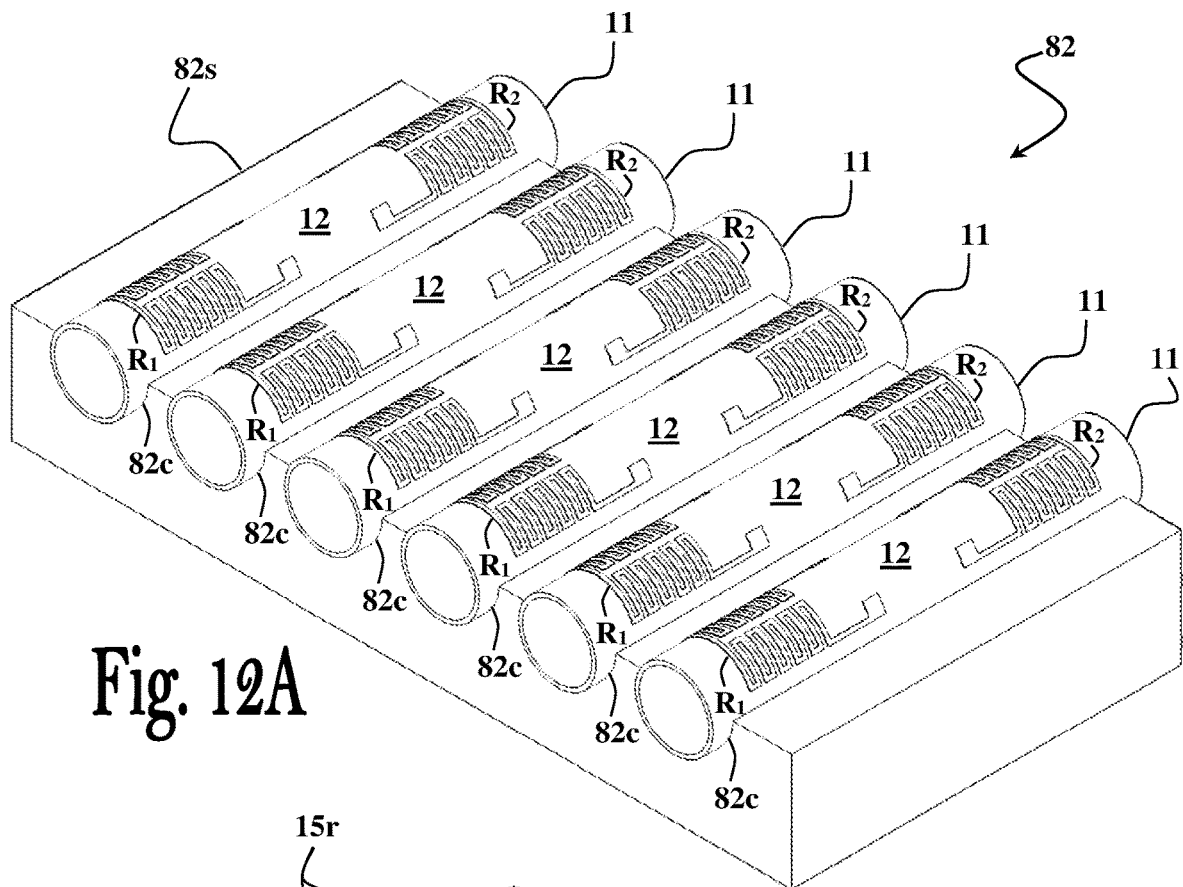
FIGS. 12A and 12B schematically illustrate production of multiple/array of sensor tubes, and possible calibration/testing of the multiple/array of sensor tubes according to some possible embodiments.
Figure 12B:
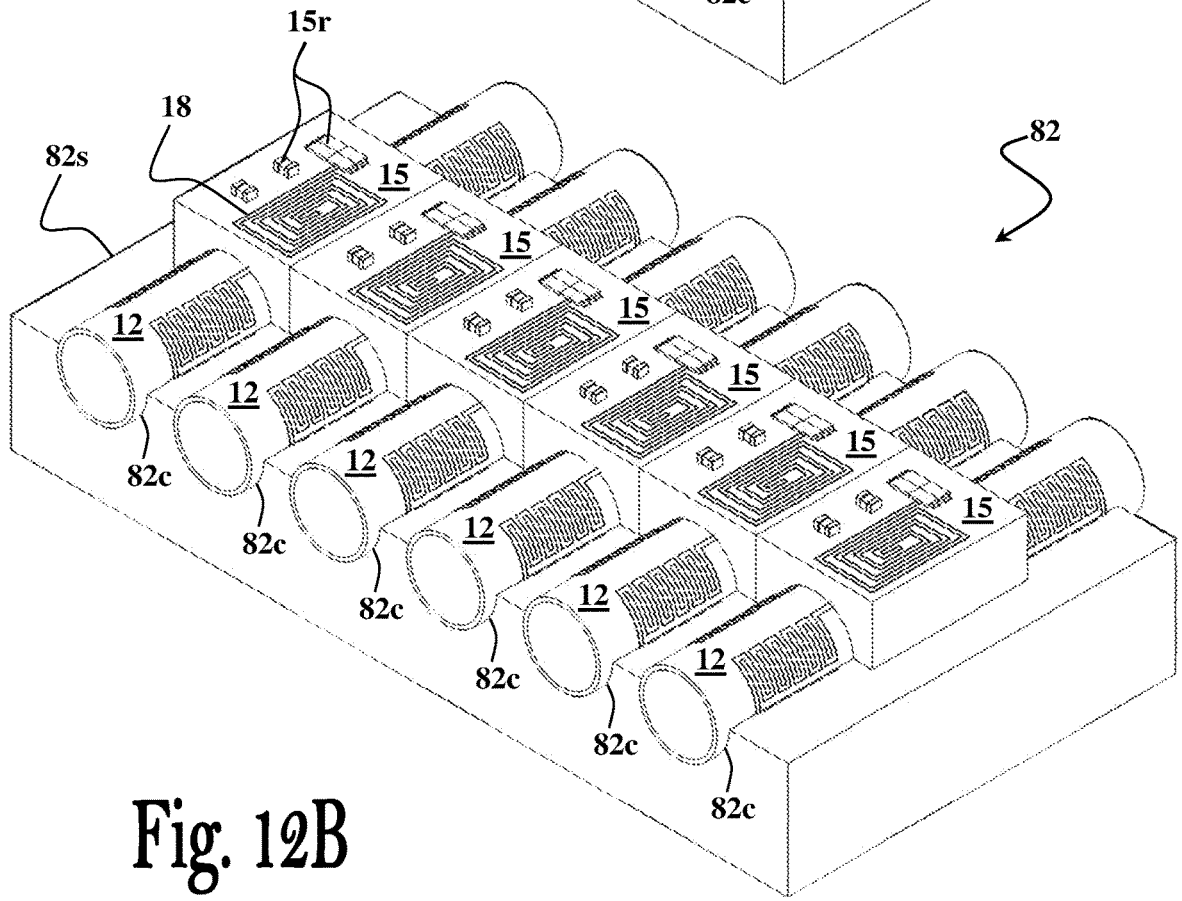

FIG. 12A demonstrates patterning of the strain gauge elements $R_i$ on the tubes array 82 held in a respective array of circular channels 82c of the support 82s. The support 82s can be configured to rotated the tubes 11 of the array 82 and use any of the techniques described herein to pattern the strain gauge elements $R_i$ on their outer surfaces. FIG. 12B demonstrates a test/calibration arrangement conducted according to possible embodiments after a respective circuitry unit 15 is mechanically and electrically connected to each sensor tube 12. This test/calibration arrangement can utilize the antenna element 18 provided in the measurement units 15 to wirelessly and simultaneously calibrate/test all sensor tubes 12 of the array 82. For this purpose one or more circuities 15r of the circuitry unit 15 can comprise wireless communication means (e.g., amplifier(s), transmitter(s), receiver(s), switch(es), etc.) for allowing wirelessly communicating data and/or instructions with the sensor tube 12 and/or its circuitry unit 15. The one or more circuities 15r can further comprise analog conditioning units (e.g., amplifier, A/D, and/or D/A), trimming elements, memory devices, power supply circuitry, and/or energy harvesting circuitry, or any other active and/or passive electronic device/component. If the sensor unit 15 does not include wireless communication means, contact pads can be patterned thereon configured for simultaneous contact therewith e.g., by a probe card.

Figure 13A:
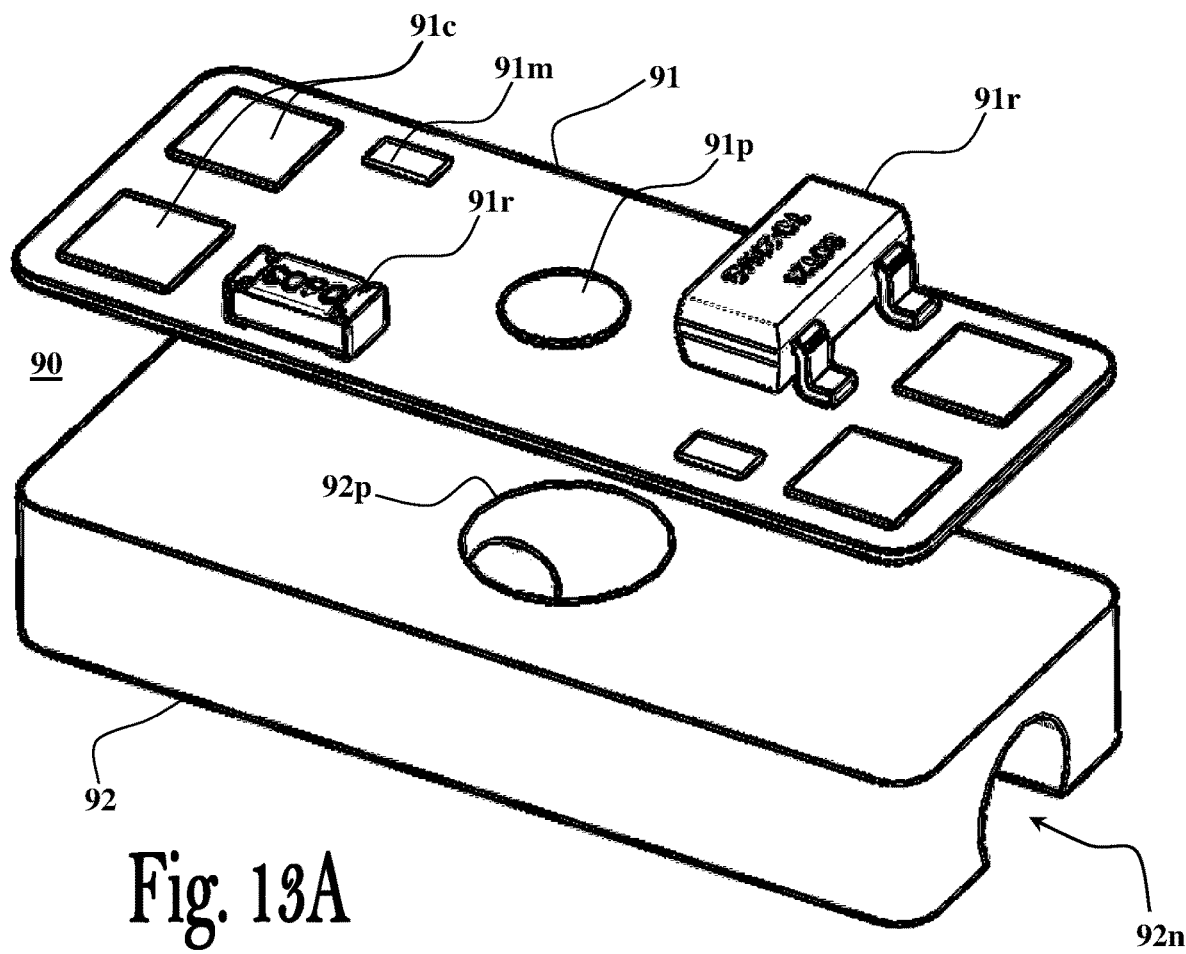
Figure 13B:
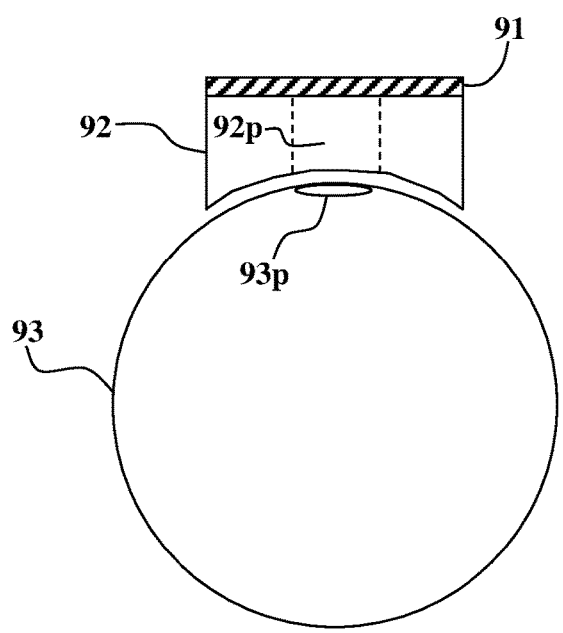

FIGS. 13A to 13D schematically illustrate various techniques for coupling sensor assembly 90 comprising a deformable element 91 having circuitries 91r and sensor element(s) 91p, to a wall section of a tube 93 according to some possible embodiments. FIGS. 13A and 13B demonstrate use of a support element 92 configured to couple a deformable element 91 and sensor element(s) thereof 91p to an external wall section of a tube 93. The sensing element(s) 91p can be patterned on both side of the deformable element 91, as explained hereinabove. The deformable element 91 may comprise contact pads 91c, integrated circuits (ICs) and SMDs 91r, and/or trimming elements 91m, and/or antenna elements, and/or any other active or passive electronic device/component needed for its operation.

The support element 92 comprises an open channel 92n, formed in a bottom side thereof and configured to receive and attach to the tube 93. A pass-through aperture 92p formed in the support element 92 for coupling between the sensing element(s) 91p of the deformable element 91 and an opening 93p formed in the tube 93. The deformable element 91 is sealably attached over the upper face of the support element 92 such that its sensing element(s) 91p is located over the pass-through aperture 92*p*, and the support element 92 is sealably attached to the tube 93 such that its pass-through aperture 92*p* is located over the opening 93*p* formed in the tube 93. In this way fluid substance streamed/introduced into the tube 93 can interact with the portion of the deformable element 91 comprising the sensing element(s) 91*p*, thereby causing deformations therein that can be measured by the sensor assembly 90.

In the non-limiting example shown in FIG. 13A, a cross section of the open channel 92*n* forms arc-angle greater than 180°, configured for snugly fitting/snapping the tube 93. However, in possible embodiments the arc-angle of the open channel 92*n* can be smaller than 180°, shown in FIG. 13B. Optionally, in possible embodiments support element 92 with its deformable element 91 can be attached over a flattened section of the tube 13 (not shown in FIGS. 13A-B), and in this case there the open channel 92*n* is not needed in the element 92.

The deformable element 91 and the support element 92 can be attached to each other by welding techniques (e.g., heat, ultrasonic, laser), by glue or by overmolding. Optionally, and in some embodiments preferably, after attaching the deformable element 91 to the support element 92, the support element 92 is attached to the tube 93 during the tube extrusion process. Alternatively, in possible embodiments, one or more openings 93*p* are formed in the tube 93, the support element 92 is thereafter attached to the tube 93 such that one or more pass-through bores 92*p* thereof communicate with the lumen of the tube 93 via the respective one or more openings 93*p*, and the deformable element 91, with its various components, is then attached to the support element 92 to sealably close the one or more pass-through bores 92*p* by portions thereof having the sensing element(s) 91*p*. Optionally, the pass-through bore 92*p* formed in the support element 92 and opening 93*p* formed in the tube 93 have different sizes/diameters. In some embodiments the sensor assembly 90 is configured to implement a pressure sensor, a temperature sensor, and/or electrical conductivity sensor.

FIG. 13C shows a sectional view of a sensor assembly 90', having a support element 92' carrying a deformable element 91 comprising circuitries and sensor element(s), and configured to attach to an internal wall section of a tube 93. The support element 92' comprises a curved face configured to maximize surface contact hereof with the internal wall of the tube 93. A pass-through aperture 92*p* can be formed in a section of the support element 92' comprising the sensor element(s) Ri of the deformable element 91, to permit deformations thereof into, or out of, the pass-through aperture 92*p* responsive to fluid pressure inside the tube 93, which can be thereby measured. Accordingly, in this embodiment the formation of an opening in the tube 93 is not necessarily required.

The circuitries carried by the deformable element 91 comprises wireless transmission means for wirelessly communicating signals/data 94*s* with an external reader/receiver 94 located near the tube 93. In some possible embodiments a battery is integrated on the deformable element 91, or into the support element 92', and the circuitries carried by the deformable element 91 is configured to sample and transmit the data/signals to the reader/receiver 94. Alternatively, or additionally, the support element 92', or the deformable element 91, can include an energy harvesting circuitry configured to power the circuitries carried by the deformable element 91, which sample and transmit the data/signals e.g., using near field communication (NFC), Bluetooth, BLE, WiFi, or any other suitable communication means, where a reader 94 placed close to the tube 93 wirelessly energize the sensor assembly and receive the data/signals thereby sensed. The reader 94 can be implemented, for example, on a dedicated unit, on a mobile phone, on a drone (which flies over the tube and collect all the sensors data e.g., agriculture/irrigation application), or connected to movable machine (e.g., tractor agriculture/irrigation application).

FIG. 13D shows a sectional view of a sensing assembly comprising a deformable element 91" carrying sensor element(s) Ri and circuitries for obtaining data/signals from the sensor element(s) Ri and transmitting the same to an external reader 94, that is configured to be directly attach to the inner wall of the tube 93 i.e., without support element.

Figure 14B:
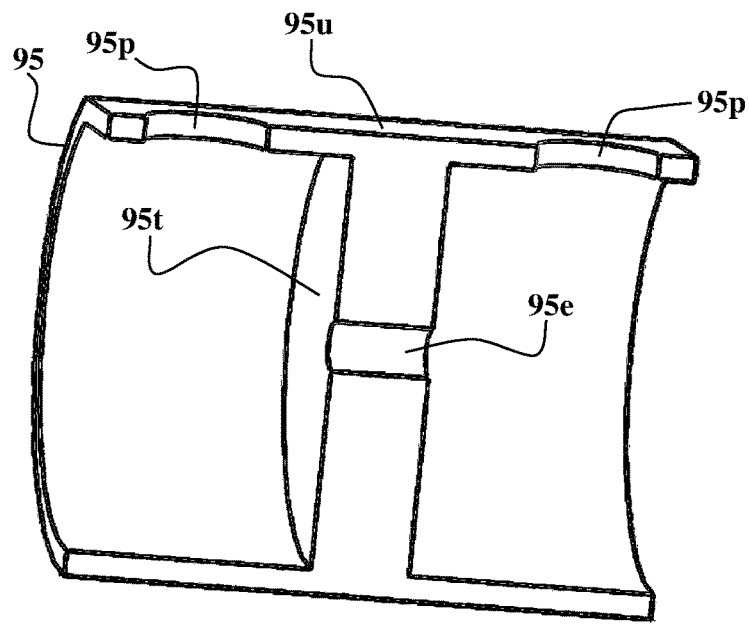
Figure 14C:
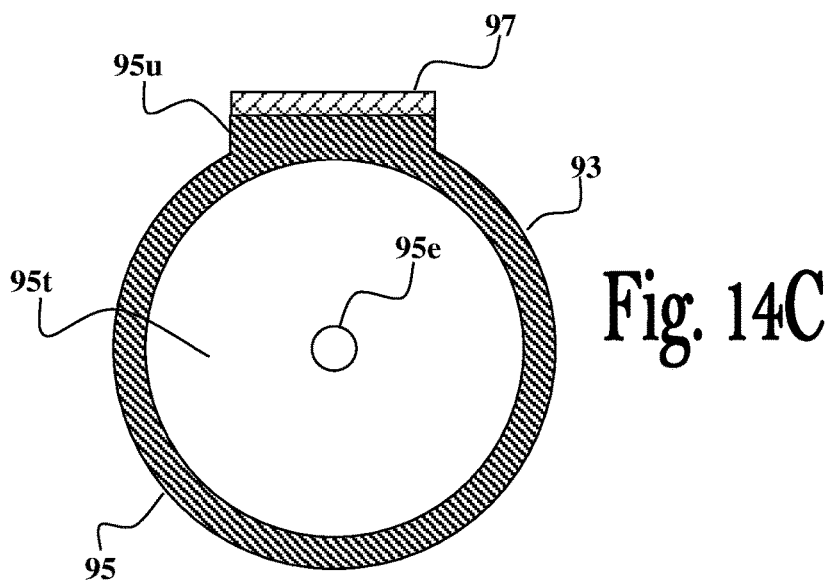

FIGS. 14A to 14C show a sensor assembly 99 attachable or insertable (e.g., during extrusion) to a tube/conduit 11 by a coupling element 95, configured to couple a deformable element 97 comprising circuitries 97*r* and sensor element(s) 97*p* to the tube 11, and forming a flow restrictor 95*t* for measuring flow rate through tube 11. The coupling element 95 is implemented by a hollow cylindrical element comprising a substantially flat support section 95*u* configured for attaching the deformable element 97 thereto. Two pass-through apertures 95*p* are formed near the extremities of the coupling element 95 for communicating between the interior of the coupling element 95 and the sensing elements 97*p* of the deformable element 97.

The restrictor 95*t* can be implemented by a partition located between the pass through apertures 95*p* and having a fluid passage 95*e* formed therein, configured to cause a pressure gradient between the two sides of the partition, when fluid substance is streamed through the tube 11. This way, the sensing elements 97*p* measure the different pressure levels affected by the restrictor 95*t*, which provide a measure of the flow rate through the tube. The deformable element 97 can be attached over the support section 95*u* of the coupling element 95 by welding, as indicated hereinabove, and the coupling element 95 can be connected to a fluid tube/conduit 93 during extrusion/pultrusion manufacture process thereof.

In some possible embodiments the deformable element 97 with its circuitries 97*r* and sensor element(s) 97*p* and at least a portion of the coupling element 95 are integrated into a wall section of a tube 11 during, or immediately after, fabrication of the tube 11 by extrusion/pultrusion process. For example, and without being limiting, the deformable element 97 with its circuitries 97*r* and sensor element(s) 97*p* can be attached to a coupling element comprising only the flat support section 95*u* (without the tubular parts of support 95) to provide an embeddable sensor plate structure introduced into the hot melt forming the tube 11 during e.g., between a spider leg and a tubing die, or right after e.g., immediately after ejected from the tubing die, the extrusion/pultrusion production process of the tube 11. Alternatively, the coupling element 95 having the deformable element 97 with its circuitries 97*r* and sensor element(s) 97*p* thereon can be embedded into the hot melt used to manufacture the tube 11, as described above.

Figure 14D:
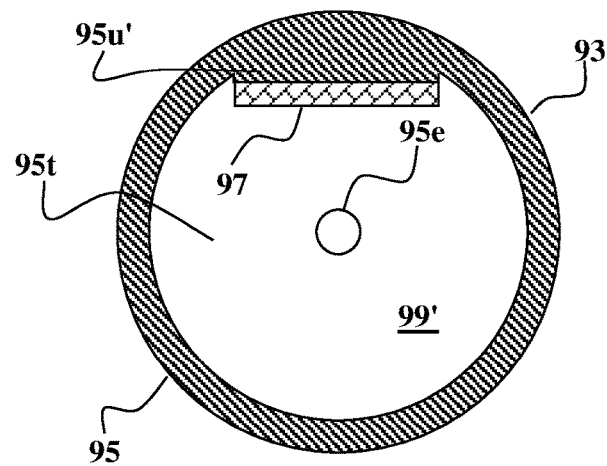

FIG. 14D shows a sensor assembly 99' according to some possible embodiments, wherein the support section 95*u*' carrying the deformable element 97 is attachable to an inner wall section of the coupling element 95.

FIGS. 15A and 15B shows a tube device 39 having one or more electrically conducting lines 39*c* formed on or in a wall section of a tube device 13. The tube device 13 can have one or more electrical devices 39*a/b* mounted/formed thereon, such as, but not limited to sensing elements according to any of the embodiments disclosed herein. In this specific and non-limiting example, the tube device 13 comprises two devices (e.g., sensors) 39*a* and 39*b*, electrically connected by one or more conducting lines 39c. Alternatively, the tube device 13 comprises one or more sensor elements connected to respective one or more contact pads by respective one or more of the electrically conducting lines 39c. Optionally, one or more wires are connected to at least one end of at least one of the conducting lines 39c e.g., instead of having contact pads, for example, for connecting thereto an external measurements reading device.

The conducting lines 39c can be made of metallic materials, or any other suitable electrically conducting material (e.g., conductive polymer(s)), and they can be used for communicating data/instructions and/or to control signals with/between the elements/sensors 39a and 39b, as power supply lines of the elements/sensors 39a and 39b, and/or for energy harvesting, and suchlike. In some embodiments the one or more conducting lines 39c formed on the inner wall of the tube device are configured as electrodes usable for electrically contacting the substance contained inside, or streamed through, the tube device 13 and measuring electrical properties thereof, such as, but not limited to electrical conductivity, of a substance introduced into the tube 13 e.g., to determine a type and/or quality of the substance. One or more vias, such as shown in FIGS. 16A to 16D can be used to establish electrical connection with the electrodes.

FIG. 15A exemplifies a tube device 13 having a single conducting line 39c, and FIG. 15B exemplifies a tube device 13 having three conducting lines 39c, but any number of such conducting lines 39c can be similarly applied, per specific implementation requirements. As will exemplified herein, the conducting lines 39c can be formed on outer wall sections of the tube device 13, and/or on inner wall sections of the tube device 13, and/or inside wall sections of the tube device 13.

FIG. 15C exemplifies a possible technique for applying the conducting lines 39c on an inner wall of a tube device 13 manufacture by rolling a raw piece of material 13h and attaching its extremities one to the other (e.g., by adhesion, welding, heat fusing, or suchlike) to form the tube device 13. As seen, the one or more electrically conducting lines 39c are formed on at least one (top and bottom) side of the raw piece of material 13h before it rolled for attaching its extremities. The one or more electrically conducting lines 39c can be formed on the raw material 13h by sputtering, evaporation, lithography, printing techniques, and/or any combination thereof. After the one or more electrically conducting lines 39c are formed on the top and/or bottom sides the raw material 13h, the raw material 13h is rolled and its extremities are sealably attached one to the other at 13w.

Figure 15D:
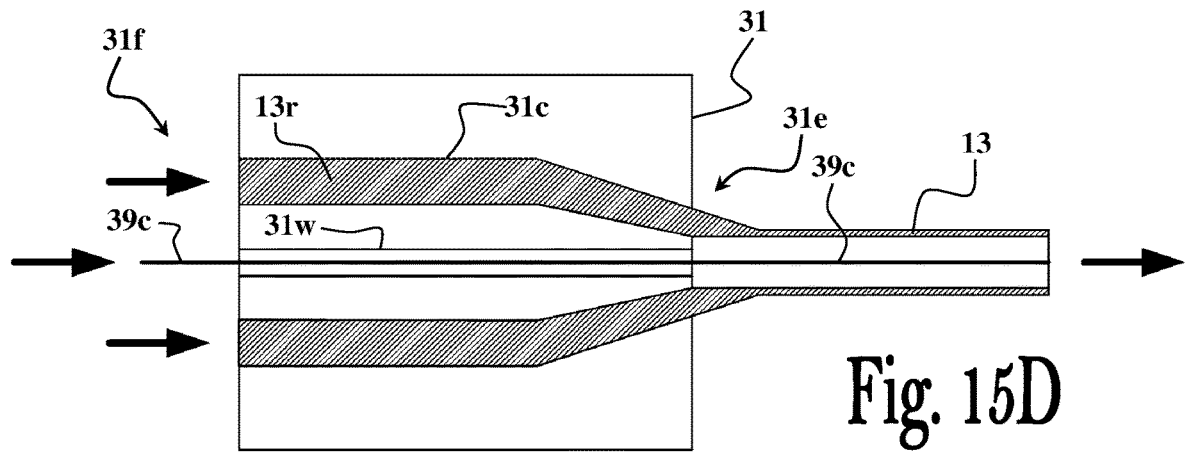

FIG. 15D exemplifies a possible technique for applying conducting lines 39c in or on an inner wall of a tube device 13 manufactured by extrusion/pultrusion system 31. The extrusion/pultrusion system 31 comprises a melt feed path 31c configured and arranged to direct the raw melt material (e.g., plastic/polymer, rubber, silicone, glass, and/or any combination thereof) 13r of the tube device 13 from a feed side 31f of the system towards a circular/ring-shaped tubing die 31e, and one or more conductors feed paths 31w configured and arranged to direct one or more respective electrically conducting lines 39c for combining onto, or into, the wall of the tube deice 13 at the tubing die 31e of the extrusion/pultrusion system 31. The conducting lines 39c can be implemented by electrically conducting wires made of Copper, Silver, Gold, aluminum, and any other suitable metal/alloy.

Figure 15E:
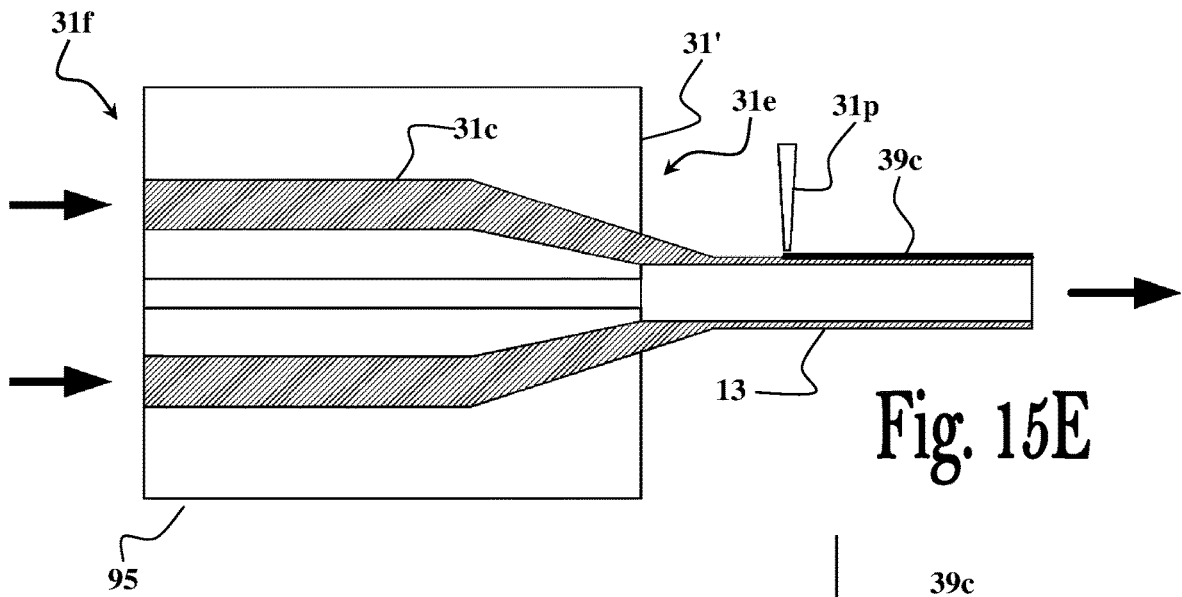

FIG. 15E exemplifies a possible technique for applying conducting lines 39c on an outer wall of a tube device 13 manufactured by extrusion/pultrusion system 31'. The extrusion/pultrusion system 31' is substantially similar to the extrusion/pultrusion system 31 shown in FIG. 15D, but does not require the conductors feed paths 31w, as in this possible embodiment the conducting lines 39c are applied on the external wall of the tube device 13 after it is discharged via the tubing die 31e by one or more applicators 31p. For example, and without being limiting, the applicators 31p can be implemented by one or more printers (e.g., jet printers) and/or sputtering nozzles, and/or any combination thereof.

Figure 16A:
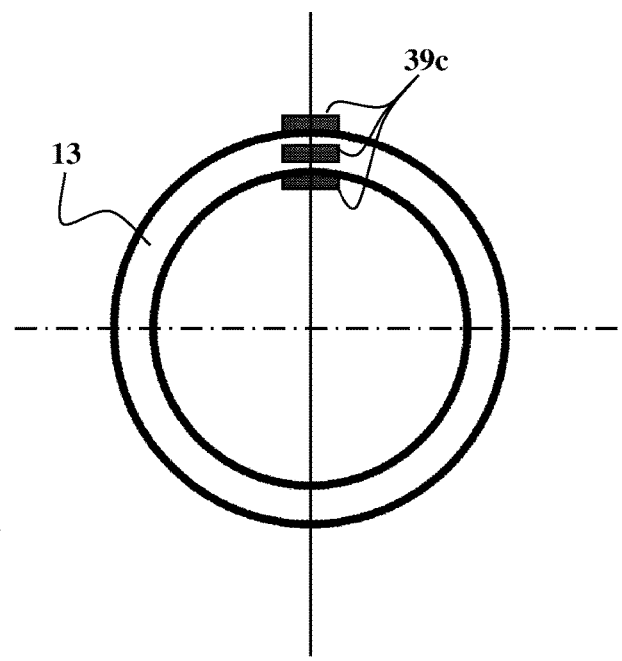

FIG. 16A shows a cross-sectional view of a tube device 13 having at least one conducting line 39c formed on its outer wall, and/or at least one conducting line 39c formed on its inner wall, and/or at least one conducting line 39c formed inside its wall e.g., by lamination between different layers of the tube wall. The conducting lines 39c can be applied using any of the techniques described herein, for example, but without being limiting, by combining the techniques shown in FIGS. 15D and 15E. In some embodiments the one or more conducting lines 39c formed on the inner wall of the tube device are configured as electrodes usable for electrically contacting the substance contained inside, or streamed through, the tube device 13 and measuring electrical properties thereof, such as, but not limited to electrical conductivity, of a substance introduced into the tube 13 e.g., to determine a type and/or quality of the substance. One or more vias, such as shown in FIGS. 16A to 16D can be used to establish electrical connection with the electrodes.

FIGS. 16B and 16C exemplify use of one or more vias 11v formed in a wall of the tube device 13 to electrically connect between conducting lines 39c formed on inner wall sections and outer wall section, and/or inside the wall, of the tube device 13. The one or more vias 13v can be formed by drilling (e.g., laser drilling, mechanical drilling, mechanical punching, or suchlike) through a portion of the wall of the tube device 13 comprising the conducting lines 39c, and thereafter filling the drilled bore with an electrically conducting material e.g., by inserting an electrically conductive insert, riveted vias, by metal deposition, such as, plating, electroplating, electroless plating, by injecting conductive gel/ink, or suchlike. In this specific and non-limiting example the via 13v is formed along a section of the tube device that is substantially centered about the conducting lines 39c, but it can be similarly used to connecting between the conducting lines 39c if it is applied adjacent a lateral extremity of the conducting lines 39c, close enough to establish electrical connection therewith.

FIG. 16D shows use of electrically conducting rivets 39r to electrically connect between the conducting lines 39c formed on inner wall sections and outer wall section, and/or inside the wall, of the tube device 13. The rivet 39r can be inserted into a drilled bore, as described above with reference to FIGS. 16B and 16C, or alternatively, it can be configured to pierce a pass-through passage through the wall of the tube device 13. After the rivet 39r is passed through the wall of the tube device 13 such that its head portion 39d contacts a portion of the conducting line 39c formed on the outer side of the wall of the tube device 13, its tail portion 39t is manipulated e.g., by pulling the rivet central portion, to form the tail abutment over the conducting line 39c formed on the inner wall of the tube device 13, and thereby establish electrical connection between the two (or more) electrically conducting lines 39c.

Figure 17A:
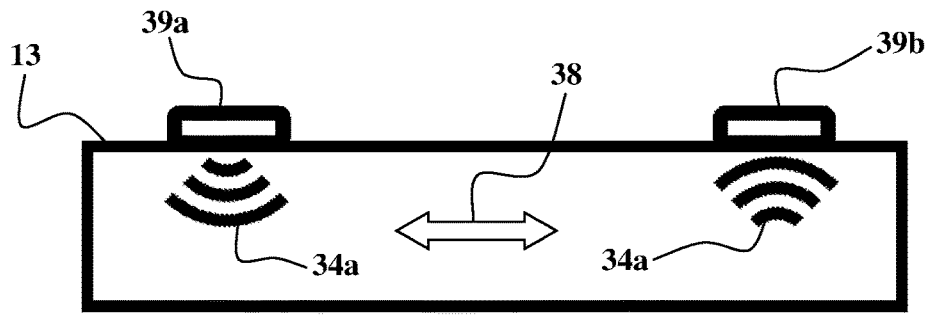
FIGS. 17A and 17B schematically illustrate techniques for communication with elements formed/mounted on a tube by sonic/ultrasonic signals.
Figure 17B:
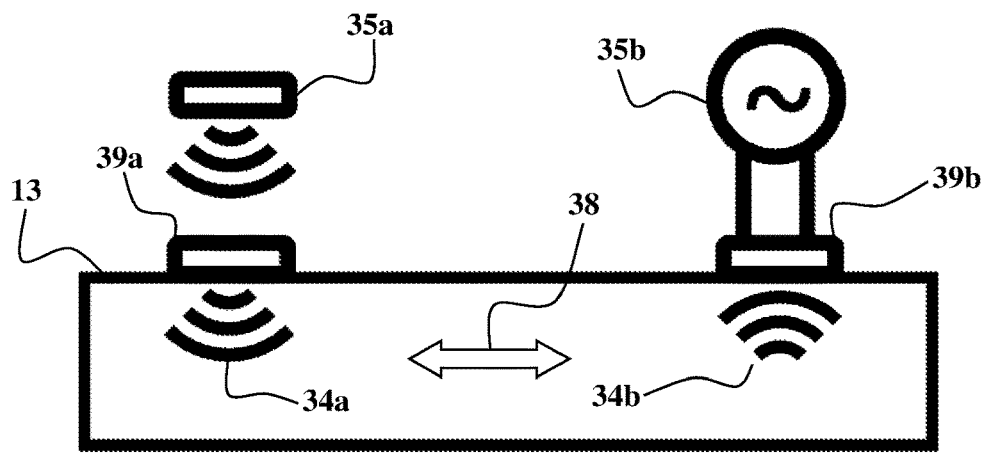

FIGS. 17A and 17B schematically illustrate techniques for communication with/between elements 39a/b formed/mounted on a tube device 13 by sonic/ultrasonic signals 34a propagating through a fluid material 38 streamed through, or introduced into, the tube device 13. For example, but without being limiting, the tube device 13 can comprise sensing elements 39*a* and 39*b*, according to any of the embodiments disclosed herein, configured and arranged to read acoustic and/or vibration (e.g., sonic and/or ultrasonic) signals 34*a* transferred by the fluid media 38 placed inside the tube device 13, and/or by the walls of the tube device 13. The signals 34*s* can be generated by an external device (not shown) coupled to the tube device 13, and/or by one or more of the sensing elements 39*a* and 39*b* formed/mounted on the tube device 13.

FIG. 17B exemplifies use of the deformable element of sensing element, 39*a* and 39*b*, as a membrane configured to generate and/or read vibration/acoustic signals transferred via the fluid media 38 of the tube device 13. For example, the sensor elements can be actuated externally (e.g., by an external electromagnetic source 35*a* coupled thereto utilizing metallic or magnetic elements formed/mounted on the deformable element), and/or piezoelectrically (e.g., by applying a piezoelectric layer on the deformable element and using electrical signal to actuate the piezoelectric layer 35*b*, such as, but not limited to Aluminum Nitrite, Ferroelectrically soft piezo ceramic materials, Piezo Materials Based on Lead Zirconate, Titanate, PZT, ZnO, to transduce the electrical signal into vibrations 34*b* for communication.

Figure 18:
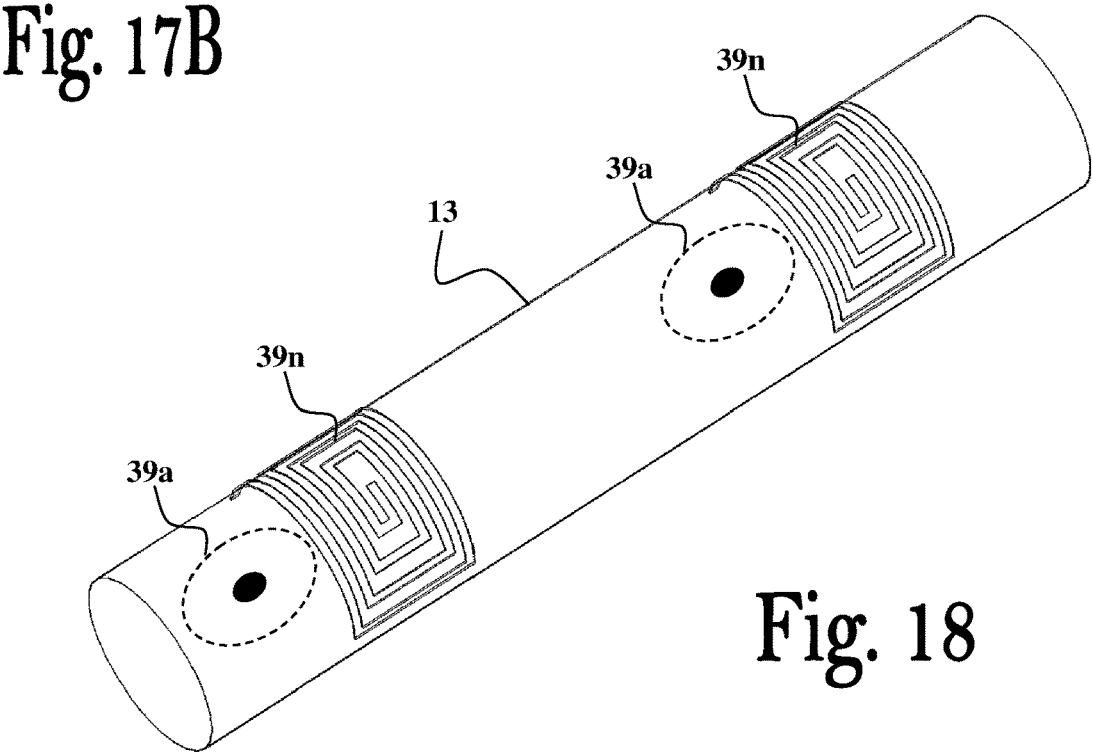
FIG. 18 schematically illustrates use of antenna elements formed/mounted on a tube for communicating data/signal with, and/or communicating signals between, electrical/sensors elements formed/mounted on the tube.

FIG. 18 schematically illustrates use of antenna elements 39*n* formed/mounted on a tube device 13 for powering (e.g., by energy harvesting), and/or communicating with, one or more elements 39*a/b* formed/mounted on the tube device 13. In this specific and non-limiting example the tube device 13 comprises two sensing elements, 39*a* and 39*b*, each coupled to a respective antenna element 39*n* configured to wirelessly communicate data/instruction and/or powering signals, with external devices. The antenna elements 39*n* can be patterned on the outer wall of the tube device 13 e.g., by Sputtering, evaporation, lithography, printing, and electrically connected to the sensing elements, 39*a* and 39*b*, by electrically conducting lines (39*c*), using any of the embodiments disclose herein.

Figure 19A:
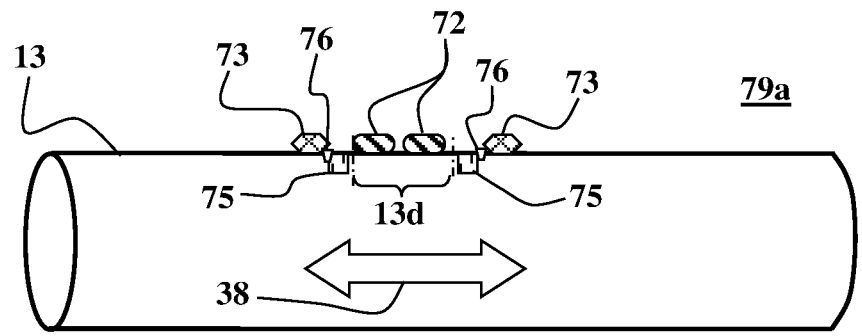
Figure 19B:
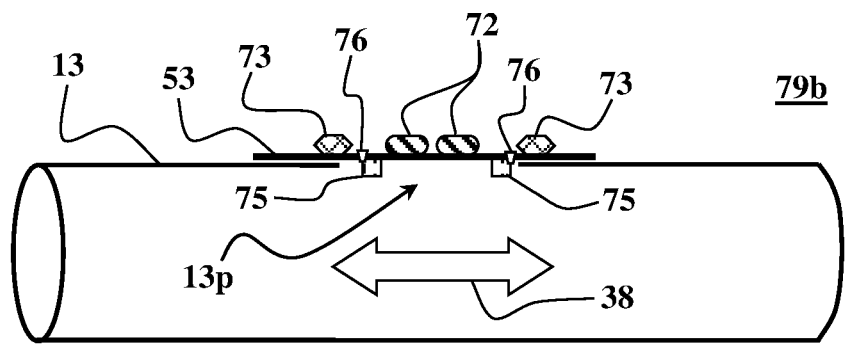
Figure 19C:
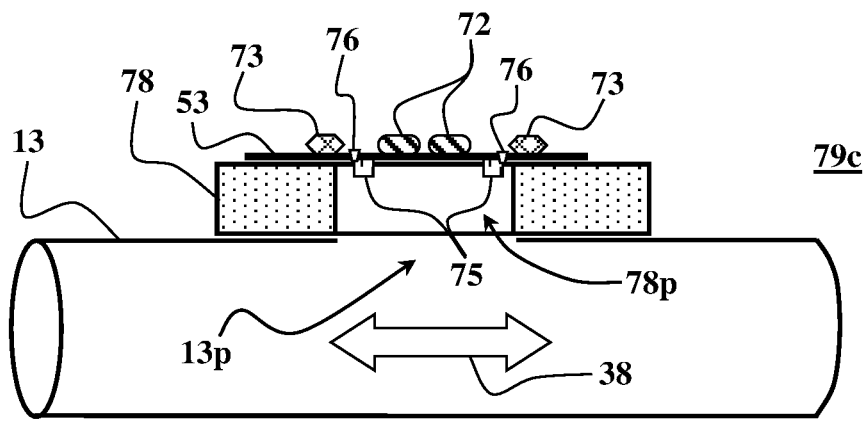

FIGS. 19A to 19C schematically illustrate tube sensor devices 79*a, b* and *c*, having electrodes 75 configured to contact a substance contained inside, or streamed through (38), the tube 13, and measure one or more electrical properties thereof, such as, but not limited to, electrical conductivity. The tube device 79*a* shown in FIG. 19A comprises one or more sensing elements 72 formed/patterned on an external surface area of a deformable wall section 13*d* of the tube 13, one or more electric elements and/or circuitries 73 formed/mounted on the external surface areas of the tube 13 and electrically coupled to the sensing elements 72, one or more electrodes 75 formed on inner surface area of the tube 13 and respective one or more vias 76 formed in the wall of the tube 13 and filled with an electrically conducting material (e.g., copper, aluminum, gold or any other suitable metal/alloy) for electrically connecting between the electrodes 75 and the one or more electric elements and/or circuitries 73.

In the tube device 79*b* shown in FIG. 19B the one or more sensing elements 72 are formed/patterned on an upper (external) surface area of a deformable sheet 53 attached to the tube 13, the one or more electric elements and/or circuitries 73 are formed/mounted on external surface areas of the deformable sheet 53 and electrically coupled to the sensing elements 72, the one or more electrodes 75 are formed on a bottom (inner) surface area of the deformable sheet 53, and the respective one or more vias 76 are formed in the wall of the deformable sheet 53 to electrically connect between the electrodes 75 and the one or more electric elements and/or circuitries 73. The deformable sheet 53 is sealably attached over an opening 13*p* formed in the wall of the tube 13 for allowing the portion of the deformable sheet 53 carrying the sensing elements 72 to interact with the substance contained inside, or streamed through (38), the tube 13, and thereby enable the sensing elements 72 to measure one or more properties and/or conditions of the substance.

The various different components of the tube device 79*c* shown in FIG. 19C are also carried by a deformable sheet 53, as shown in FIG. 19B, but instead of attaching the deformable sheet 53 directly to the tube 13 it is attached to an intermediating support element 78. The support element 78 comprises one or more pass-through bores 78*p* and it is attached to the tube 13 such that its one or more pass-through bores 78*p* establish fluid communication with respective one or more openings 13*p* formed in the wall of the tube 13. The deformable sheet 53 is sealably attached over the opening of the support element 78 such that portions of the deformable sheet 53 carrying the one or more sensing elements 72 are placed over the one or more pass-through bores 78*p* (i.e., over their openings), allowing the portion of the deformable sheet 53 carrying the sensing elements 72 to interact with the substance contained inside, or streamed through (38), the tube 13, and thereby enable the sensing elements 72 to measure one or more properties and/or conditions thereof.

The one or more sensing elements 72 can be formed using any of the techniques described herein, and in some embodiments they are used for measuring pressure, and/or flow rate, and/or temperature, of the substance contained inside, or streamed through (38), the tube 13. The one or more electric elements and/or circuitries 73 comprises in some embodiments, one or more contact pads, and/or one or more antenna elements, and/or one or more IC elements (e.g., memories, processors, amplifiers, A/D, D/A) SMD components, and/or one or more conducting lines, formed/mounted and configured as described in the embodiments disclosed herein. The electrodes 75 can be formed/mounted by sputtering, evaporation, lithography, plating, printing, drilling and insertion of conductive material, and the vias 76 by plating, electroplating or electroless plating, drilling and insertion of conductive material.

In some embodiments the one or more electric elements and/or circuitries 73 are configured to receive and analyze signals measured by the one or more electrodes 75, and determine based thereon quality and/or consistency of the substance contained inside, or streamed through (38), the tube 13. For example, and without being limiting, if a medicament is administered to a patient through the tube device 79*a*, 79*b* or 79*c* (or by tube device of other embodiments disclosed herein), the electric elements and/or circuitries 73 can be configured to verify based on the signals from the electrodes 75 that the right medicament, and/or right concentration thereof, is being administered. In a similar fashion, if the tube device is used to supply raw material to a production process, the electric elements and/or circuitries 73 can be configured to identify based on the signals from the electrodes 75 the type of material that is being supplied, and/or its quality and/or concentration, and generate data indicative thereof.

In some embodiments at least one of the elements 75 patterned/attached in FIG. 19A to the inner wall of the tube 13, and on FIGS. 19B and 19C to the underside of the deformable sheet 53, can be a sensor device electrically connected to at least one via 76 and configured to contact the substance/fluid inside the tube 13 and measure one or more properties thereof e.g., pH, transparency and/or turbidity, and suchlike. In some possible embodiments at least one of the elements 75 is an SMD component mounted on the underside of the tube wall/deformable sheet electrically connected to at least one via 76 and configured to interact with the substance/fluid in the tube 13 and generate data/signals indicative of at least one property or condition thereof.

Optionally and in some embodiments preferably, the sensor elements used in the various embodiments disclosed herein for measuring fluid pressure and/or flow rate, are implemented by a type of strain gauge sensor, which can be configured in possible embodiments for measuring electrical conductivity and/or temperature. It is noted that the different embodiments and techniques disclosed herein can be similarly used to construct sensor assemblies on various curved surfaces i.e., not necessarily round/circular surfaces, and also on substantially flat surfaces. These features can be advantageously exploited to construct sensor assemblies on a myriad of different objects, such as, but not limited to, different types of packaging (e.g., food products), sealers/caps, machinery chassis, and suchlike.

It should also be understood that throughout this disclosure, where a process or method is shown or described, the steps of the method may be performed in any order or simultaneously, unless it is clear from the context that one step depends on another being performed first.

Terms such as top, bottom, front, back, right, and left and similar adjectives in relation to orientation of the tube devices and components thereof refer to the manner in which the illustrations are positioned on the paper, not as any limitation to the orientations in which the apparatus can be used in actual applications.

As described hereinabove and shown in the associated figures, the present invention provides sensor tubes configured and arranged for measuring physical condition/state of fluid substance(s) streamed/introduced into the tubes, and related methods for manufacturing and calibrating them. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A sensing tube device comprising:
a cylindrical tube element made of a polymeric material having a curved or rounded surface;
a support element made of a polymeric material configured as a rigid and substantially non-deformable structure having a curved or rounded surface adapted for direct integration with said curved or rounded surface of the polymeric material of said cylindrical tube element;
a deformable element directly attached to said rigid and substantially non-deformable support element and having one or more sensor elements;
wherein at least one of said one or more sensor elements is configured to measure at least one property or condition of a substance contained or streamed inside said cylindrical tube element,
wherein said rigid and substantially non-deformable support element is integrally attached to the curved or rounded surface of said cylindrical tube element and comprises at least one cavity or opening configured for interaction between said deformable element and the substance contained or streamed inside said cylindrical tube element.

2. The sensing tube device of claim 1, further comprising one or more electrically conducting lines formed on, or in, a wall section of the cylindrical tube element and electrically connected to at least one of the sensor elements, and at least one via formed in the wall of the cylindrical tube element for electrically connecting therethrough to at least one of the electrically conducting lines.

3. The sensing tube device of claim 2, further comprising one or more sensor elements formed or attached on respective one or more inner wall sections of the cylindrical tube element, and one or more respective vias formed in the wall of the cylindrical tube element for electrically connecting to said one or more sensor elements, said one or more sensor elements configured to interact with the substance inside the cylindrical tube element, measure at least one property or condition thereof, and generate data/signals indicative thereof.

4. The sensing tube device of claim 1, further comprising at least one antenna element electrically coupled to at least one electrical element of the sensor tube device for communicating data/signals with an external device.

5. The sensing tube device of claim 1, wherein at least one of the sensor elements is configured to communicate vibratory signals propagating through the substance contained inside, or streamed through, the cylindrical tube device, and/or propagating through the wall of the cylindrical tube device.

6. The sensing tube device of claim 1, further comprising at least one constriction formed inside the cylindrical tube element adjacent to at least one of the sensor elements.

7. The sensing tube device of claim 1, further comprising at least one opening formed in the wall of the cylindrical tube element, and wherein the at least one opening of the rigid and substantially non-deformable support element is formed by at least one pass-through bore formed in the rigid and substantially non-deformable support element and being in fluid communication with said at least one opening of said cylindrical tube element, and wherein the deformable element is attached to said rigid and substantially non-deformable support element to sealably cover by respective one region thereof comprising at least one of the one or more sensor elements the at least one pass-through bore of the rigid and substantially non-deformable support element.

8. The sensing tube device of claim 1 comprising:
one or more vias formed in the deformable element; and
one or more electrodes provided on the deformable element and configured to contact the substance inside the cylindrical tube element and measure one or more electrical properties thereof, or one or more sensor elements provided on the deformable element and configured to interact with the substance inside the cylindrical tube element and measure at least one property or condition thereof, wherein said one or more vias are electrically connecting to said one or more electrodes or sensor elements provided on the deformable element.

9. The sensing tube device of claim 1, wherein the rigid and substantially non-deformable support element is configured to establish electrical connection with at least one sensor element provided on or in a wall section of the cylindrical tube element for signal communication and/or power supply, and wherein said rigid and substantially non-deformable support element comprising at least one electrical element and/or circuitry and/or antenna element formed on, or attached to, the rigid and substantially non-deformable support element for signal communication with said sensing tube device and/or providing power supply thereto.

10. The sensing tube device of claim 9, wherein the rigid support element is configured for at least one of the following: deform a wall section of the cylindrical tube element and thereby form at least one constriction inside the cylindrical tube element; and substantially prevent deformations from occurring in at least one other wall portion of the cylindrical tube element.

11. The sensing tube device of claim 1, further comprising at least one electrode formed in or on at least one inner wall section of the cylindrical tube element, at least one via formed in the wall of the cylindrical tube element for electrically connecting to said at least one electrode.

12. The sensing tube device of claim 1, wherein the one or more sensor elements are configured and arranged to measure at least one of pressure, temperature, electrical conductivity, and flow rate of a fluid substance introduced into the cylindrical tube element.

13. The sensing tube device of claim 1, further comprising a measurement circuitry attached to the cylindrical tube element, and/or to the deformable element, and/or to the rigid and substantially non-deformable support element integrally attached to the cylindrical tube element, said measurement circuitry electrically coupled to at least one of the one or more sensor elements.

14. The sensing tube device of claim 1, further comprising at least one of a memory, optically readable medium or markings having calibration data associated with said sensing tube device stored or encoded therein.

15. A method of fabricating a sensing tube device, the method comprising:
   patterning or attaching on a deformable element one or more sensor elements;
   attaching said deformable element to a rigid and substantially non-deformable support element made of a polymeric material and having a curved or rounded surface, said rigid and substantially non-deformable support element comprising at least one cavity or opening configured for interaction between said deformable element and a substance contained or streamed inside said sensing tube element; and
   integrally attaching the curved or rounded surface of said rigid support element to a curved or rounded surface of a cylindrical tube element made of a polymeric material configured for direct integration with the polymeric material of said rigid and substantially non-deformable support element.

16. The method of claim 15, further comprising:
   forming one or more electrically conducting lines on, or in, an at least partially curved or rounded wall section of the cylindrical tube element, and
   electrically connecting said one or more electrically conducting lines to at least one of the sensor elements,
   wherein the forming of said one or more electrically conducting lines comprises either:
      introducing an electrically conducting wire in, or on, said at least partially curved or rounded wall of the cylindrical tube element, in an extrusion or pultrusion process used to manufacture said cylindrical tube element; or
      pattering said one or more electrically conducting lines on said at least partially curved or rounded wall of the cylindrical tube element after it is ejected in an extrusion or pultrusion process used to manufacture said cylindrical tube element.

17. The method of claim 16, further comprising at least one of the following:
   forming at least one via in the at least partially curved or rounded wall of the cylindrical tube element for electrically connecting to the electrically conducting lines;
   forming or attaching at least one electrical element, and/or circuitry, and/or antenna element on the at least partially curved or rounded wall of the cylindrical tube element or on the rigid and substantially non-deformable support element, and electrically coupling said at least one electrical element, and/or circuitry, and/or antenna element to at least one of the one or more sensor elements;
   patterning or attaching at least one of the one or more sensor elements on an at least partially curved or rounded inner wall section of the cylindrical tube element; and
   forming at least one via in the at least partially curved or rounded wall of the cylindrical tube element for electrically connecting to the at least one sensor element formed on the inner wall section of the cylindrical tube element.

18. The method of claim 15, further comprising at least one of the following:
   forming at least one electrode on at least partially curved or rounded inner wall section of the cylindrical tube element, forming at least one via in the wall of the cylindrical tube element, and electrically connecting between said at least one via and said at least one electrode;
   forming at least one electrode on the deformable element for said at least one electrode to contact the substance introduce into said tube, forming respective at least one via in said deformable element, and electrically connecting between said at least one via and the at least one electrode;
   forming or attaching at least one sensor element on the deformable element for said at least one sensor to contact the substance introduced into said cylindrical tube element, forming respective at least one via in the deformable element, and electrically connecting between said at least one via and the at least one sensor element.

19. The method of claim 15, further comprising at least one of the following:
   establishing electrical connection between an electrical component of said rigid and substantially non-deformable support element and at least one sensor elements formed on or in an at least partially curved or rounded surface of the cylindrical tube element;
   forming or attaching at least one electrical element, and/or circuitry, and/or antenna element on the rigid and substantially non-deformable support element or on the deformable element, and communicating measurement data/signals generated by said one or more sensor elements therewith;
   deforming by said rigid and substantially non-deformable support element at least a portion of the cylindrical tube element to form at least one constriction thereinside;
   attaching the rigid support element with the deformable element attached thereto to an inner wall section of the cylindrical tube element;
   forming at least one opening in the wall of the cylindrical tube element, and forming the at least one opening or cavity of the rigid and substantially non-deformable support element by a pass-through bore, and attaching the deformable element to said rigid and substantially non-deformable support element to sealably cover said pass-through bore by respective one region of said deformable element comprising at least one of the one or more sensor elements, wherein the attaching of said rigid and substantially non-deformable support element comprises establishing fluid communication between said opening in the wall of the cylindrical tube element and said pass-through bore.

20. A measurement device comprising:

a cylindrical tube element made of a polymeric material having a curved or rounded surface and at least one lumen usable for containing or streaming a substance;

at least one sensor element formed or patterned on or in an at least partially curved or rounded internal or external wall of said cylindrical tube element; and a rigid and substantially non-deformable support element comprising at least one electrical element and/or circuitry and/or antenna element, said rigid and substantially non-deformable support element made of a polymeric material having a curved or rounded surface directly integrated with the curved or rounded surface of said cylindrical tube element and configured for electrically connecting said at least one electrical element and/or circuitry and/or antenna element thereby carried to said at least one sensor element for signal communication therewith and/or for providing power supply thereto.

* * * * *